(12) United States Patent
Michalk-Allaire

(10) Patent No.: US 11,039,632 B2
(45) Date of Patent: Jun. 22, 2021

(54) INSTANT FREEZER APPARATUS AND METHOD OF USING THE SAME

(71) Applicant: Julien Michalk-Allaire, Montreal (CA)

(72) Inventor: Julien Michalk-Allaire, Montreal (CA)

( * ) Notice: Subject to any disclaimer, the term of this patent is extended or adjusted under 35 U.S.C. 154(b) by 78 days.

(21) Appl. No.: 16/069,345

(22) PCT Filed: Jan. 11, 2017

(86) PCT No.: PCT/CA2017/050035
§ 371 (c)(1),
(2) Date: Jul. 11, 2018

(87) PCT Pub. No.: WO2017/120673
PCT Pub. Date: Jul. 20, 2017

(65) Prior Publication Data
US 2019/0021372 A1    Jan. 24, 2019

Related U.S. Application Data

(60) Provisional application No. 62/277,188, filed on Jan. 11, 2016.

(51) Int. Cl.
| | | |
|---|---|---|
| *A23L 3/37* | (2006.01) | |
| *F25D 3/10* | (2006.01) | |
| *C12H 1/16* | (2006.01) | |
| *F25C 5/04* | (2006.01) | |
| *F25C 1/00* | (2006.01) | |

(52) U.S. Cl.
CPC .................. *A23L 3/37* (2013.01); *C12H 1/16* (2013.01); *F25C 1/00* (2013.01); *F25C 5/04* (2013.01); *F25D 3/10* (2013.01); *A23V 2002/00* (2013.01); *F25C 2400/06* (2013.01)

(58) Field of Classification Search
CPC .......... F25C 1/00; F25C 2400/06; F25C 1/22; F25C 1/08; F25C 5/04; F25D 3/10
USPC ............................................................. 62/66
See application file for complete search history.

(56) References Cited

U.S. PATENT DOCUMENTS 4,942,742 A * 7/1990 Burruel .................... F25C 1/04
249/119

FOREIGN PATENT DOCUMENTS

| | | | | |
|---|---|---|---|---|
| GB | 2265331 A | * | 9/1993 | ............. A47G 23/04 |
| WO | WO-8907228 A1 | * | 8/1989 | ................ F25D 3/10 |
| WO | WO-0223103 A1 | * | 3/2002 | ................ A23G 9/44 |

* cited by examiner

*Primary Examiner* — Steve S Tanenbaum
(74) *Attorney, Agent, or Firm* — Brouillette Legal Inc.; Robert Brouillette

(57) ABSTRACT

An instant freezer apparatus able to freeze consumable fluids and food having a freezing point lower than water is disclosed. The apparatus and method of the present invention is directed to a freezer typically able to instantly freeze consumable fluids and food without altering their chemical compositions. The instant freezer apparatus generally comprises a main frame and a removable freezing module. The apparatus may further comprise a freezing fluid injection system such as a liquid carbon dioxide tank or a liquid nitrogen tank fluidly connected to the main frame.

16 Claims, 40 Drawing Sheets

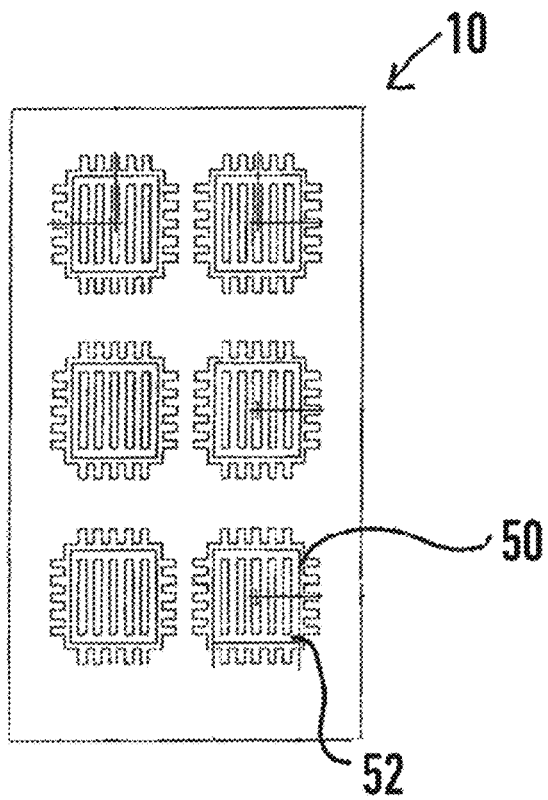
FIG. 9
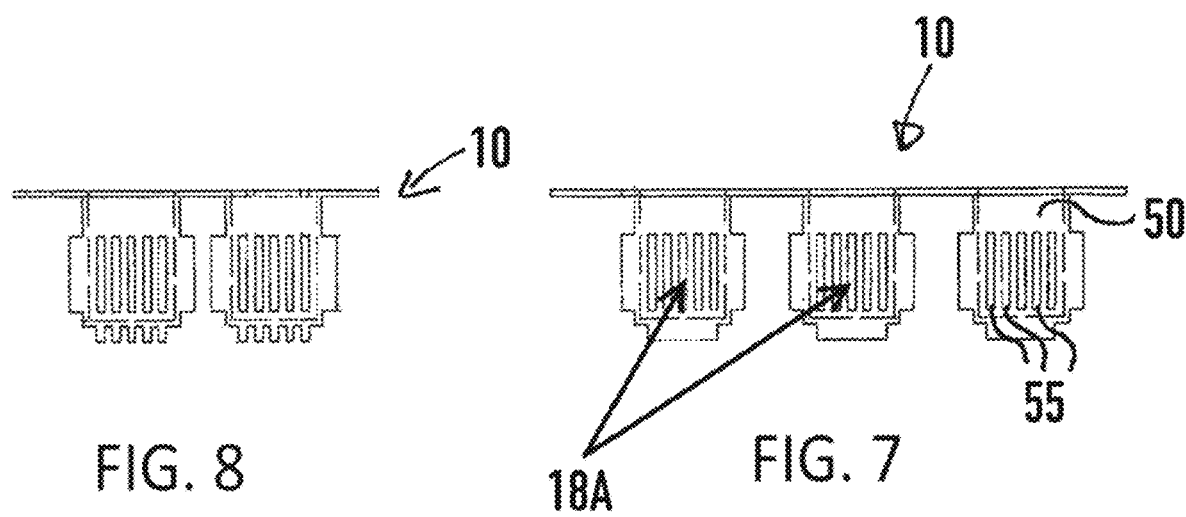
FIG. 8
FIG. 7

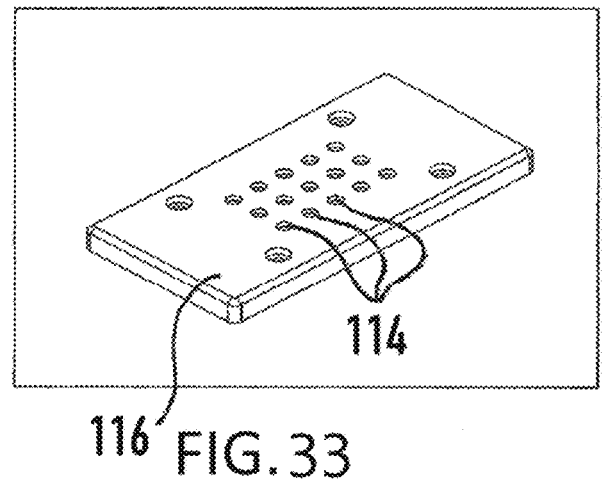
FIG.33

FIG.29 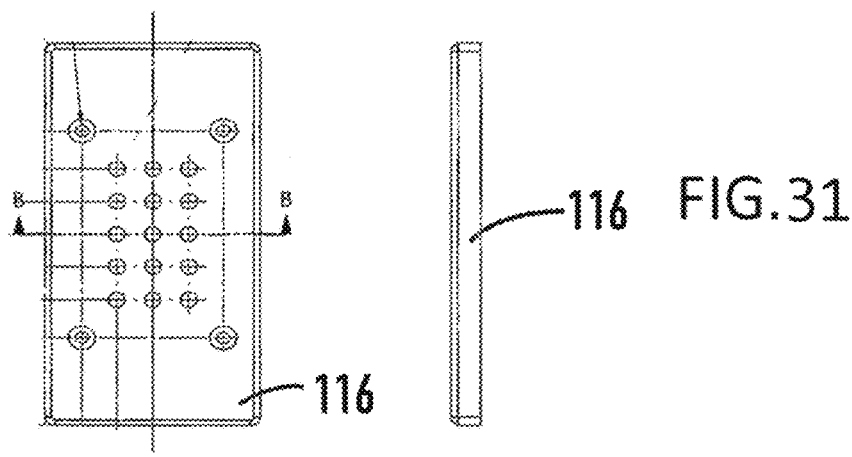 FIG.31

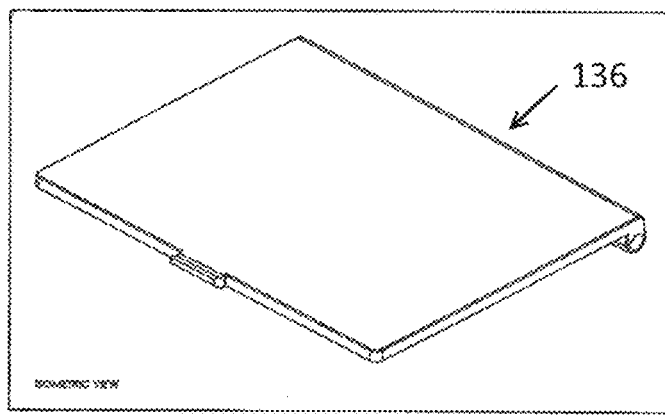
FIG.40
FIG.44
FIG.41
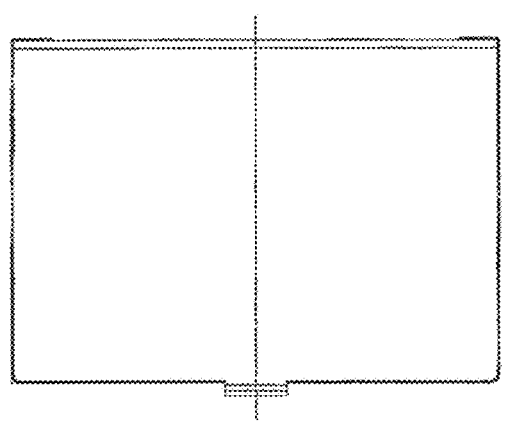
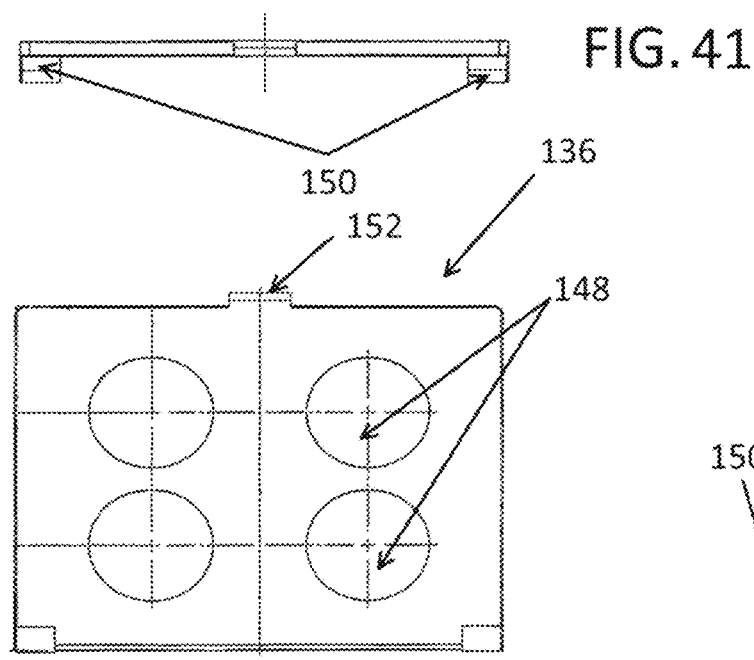
FIG.42
FIG.43

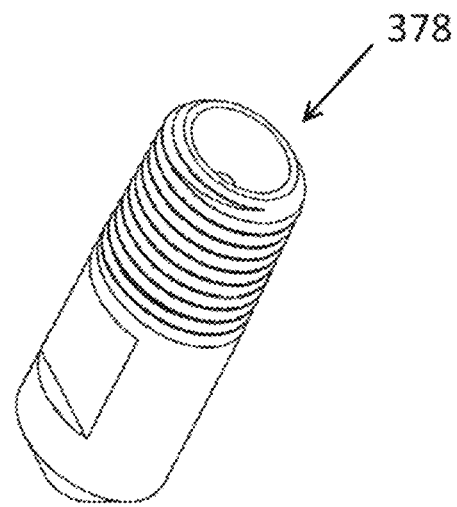
FIG. 61
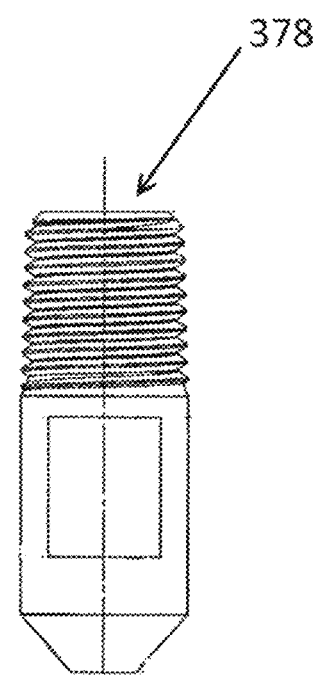 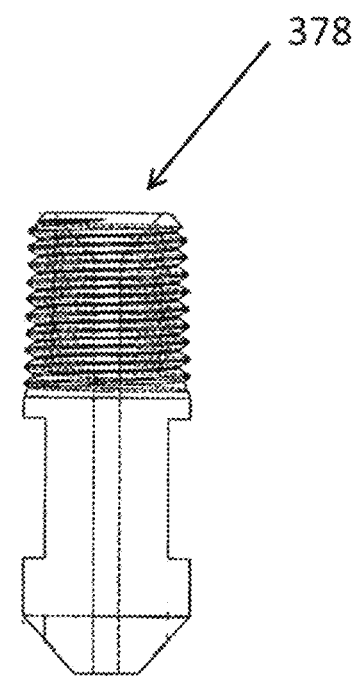
FIG. 62     FIG. 63

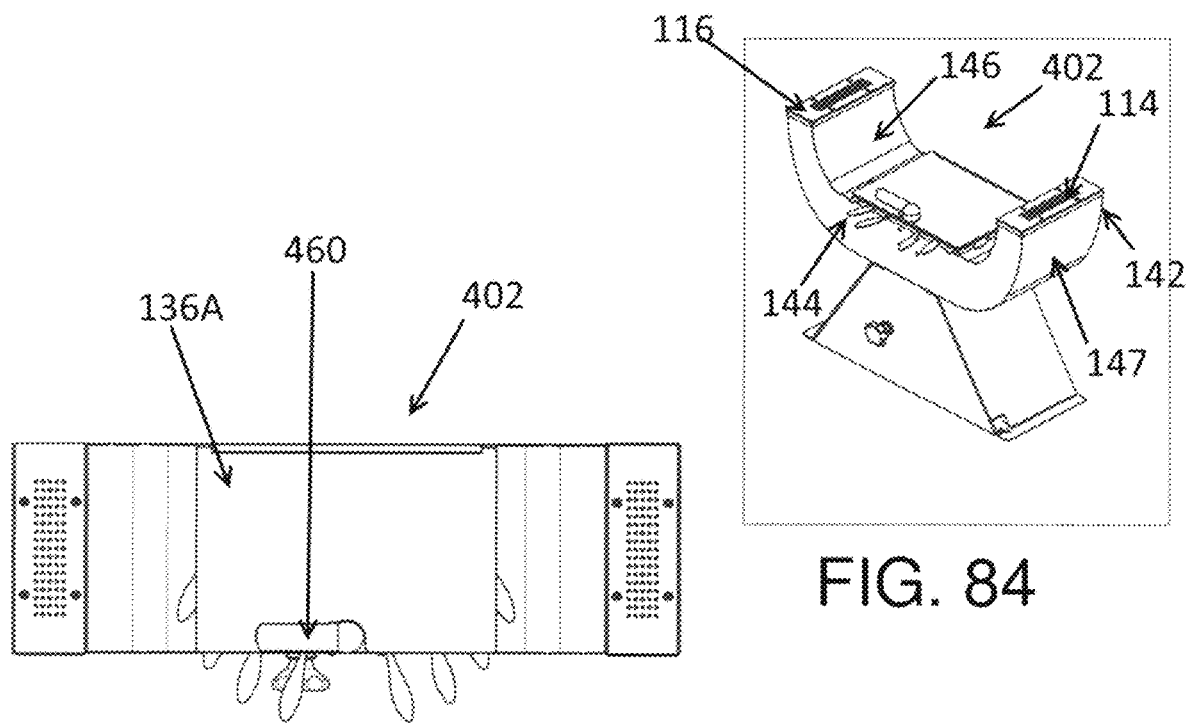
FIG. 84
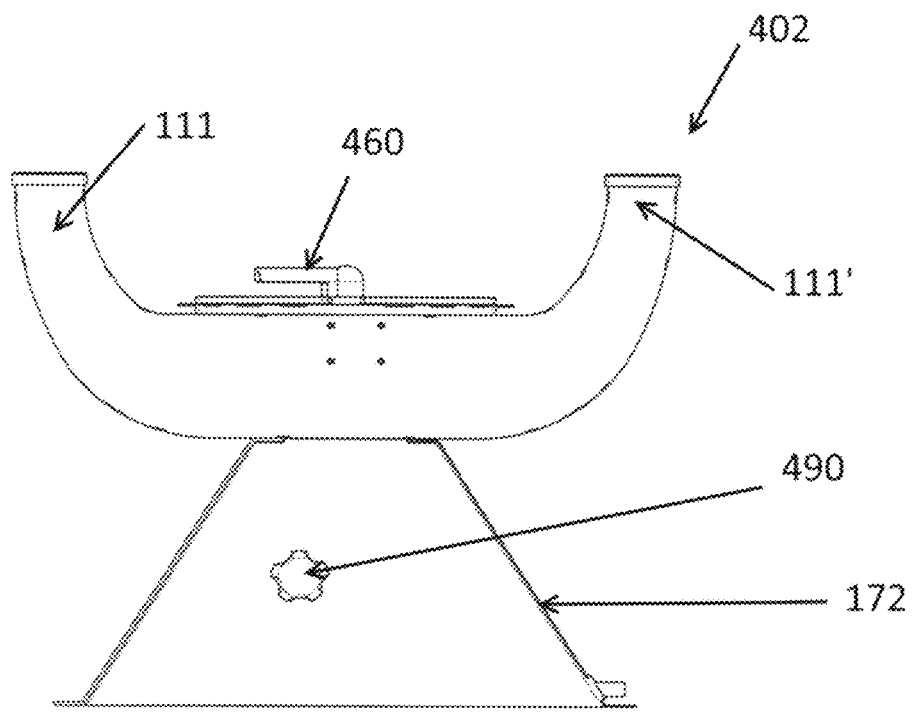
FIG. 86
FIG. 85

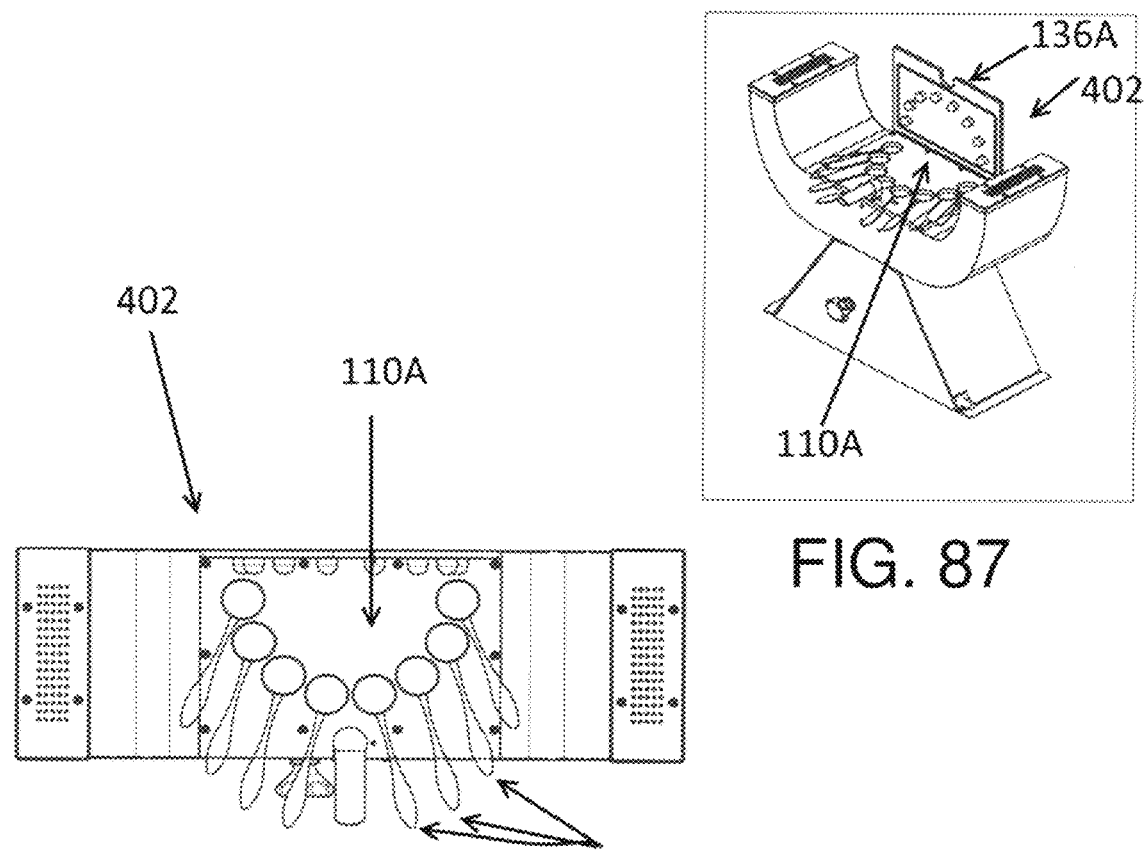
FIG. 87
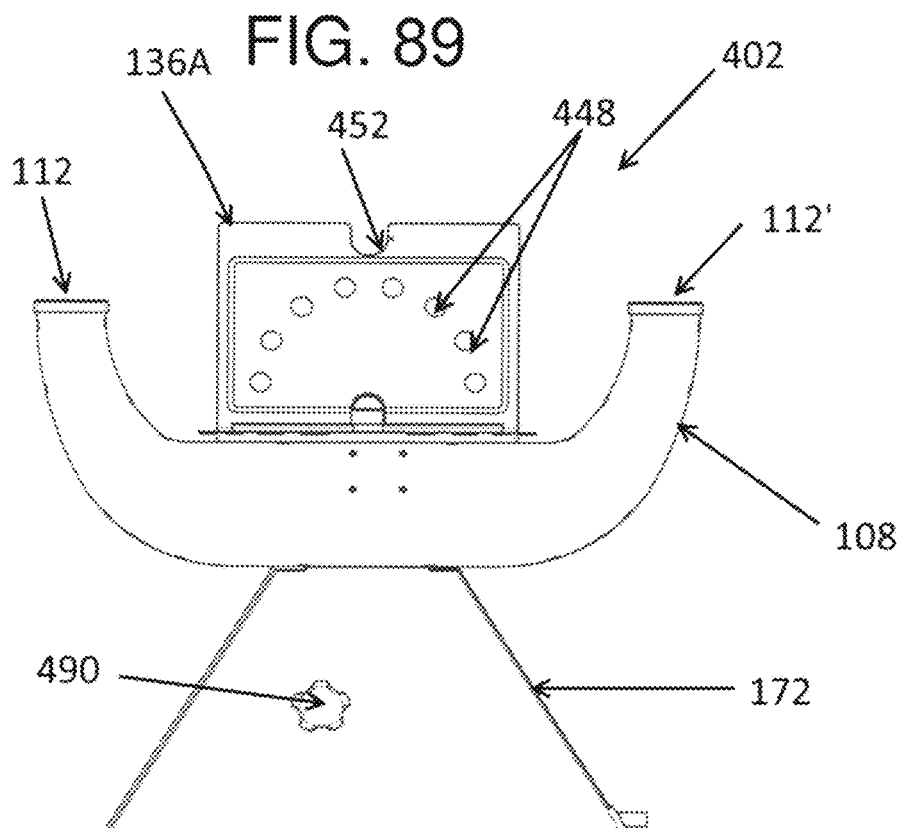
FIG. 89
FIG. 88

INSTANT FREEZER APPARATUS AND METHOD OF USING THE SAME

CROSS-REFERENCE TO RELATED APPLICATIONS

The present patent application claims the benefits of priority of the U.S. provisional Patent Application No. 62/277,188 entitled "Instant Freezer Apparatus and Method of Using the Same" and filed at the United States Patent and Trademark Office on Jan. 11, 2016.

FIELD OF THE INVENTION

The present invention generally relates to apparatuses and methods directed to freezing fluids or food. More particularly, apparatuses and methods that allow the freezing of consumable fluids or food in a short lapse of time and without modifying their chemical composition.

BACKGROUND OF THE INVENTION

Alcohol has been consumed by humans for hundreds of years. However the entertainment and food industries are always on the look for the next feature to make the alcohol consumption a novel and unique experience.

The way alcohol is served typically varies from countries to countries and to some extent may depend on cultures. In northern countries, some bartenders created ice glasses in which people enjoy cold alcoholic beverages. Similarly, prior art comprises cryogenically freezing all kinds of food including alcohol.

The idea of serving ice cold beverages has been around for some time. However, existing regulations present in the food and entertainment industries prevent bar owners from pre-freezing drinks such as alcohol shots thereby rendering the serving of frozen beverages somewhat unappealing.

Several prior art documents disclosed methods for making cryogenically freezing food or liquids. However none of the prior art discloses an apparatus or a method that is safe, simple to use, and that allows for the freezing of consumable substance, such as alcoholic beverages, in a short lapse of time without modifying the chemical composition of the substances to be frozen and without any additives.

SUMMARY OF THE INVENTION

The shortcomings of the prior art are generally mitigated by providing a novel apparatus and method enabling the preparation of frozen consumable substance, such as fluids or food, in a very short time period and without modifying the chemical composition of the substance to be frozen.

The apparatus generally comprises a main frame having an ice-cube type receptacle tray, and a freezing fluid injection system which is fluidly connected thereto. The fluid contained by the injection system is typically liquid carbon dioxide or liquid nitrogen. The apparatus may be connected to an integrated freezing fluid injection system or may be connected to an external freezing fluid injection system. If the apparatus is connected to an external injection system, the main frame comprises a connector fluidly connected to the external injection system. A method for using an instant freezer apparatus comprises the steps for an operator, typically a bartender, to open the freezing injection system, thus allowing the freezing fluid to enter the main frame of the apparatus. For instance, the freezing fluid injection system may be configured to maintain a constant debit of the freezing fluid within the freezing chamber, preferably by the mean of a valve. The injection system may be constantly monitored to ensure adequate level of the freezing fluid.

According to the principle of the present invention, the main frame is preferably built using material supporting extremely cold temperatures and large temperature differences, such as, but not limited to, stainless steel, aluminum, copper or any composite material having such properties. The material of the apparatus shall also be determined by the type of freezing fluid used to cool the apparatus. The main frame generally provides a mould cavity or a freezing cell having a preferable height of about at least one centimetre. Such shape of the cavity or cell are thus generally suitable for the production of ice cubes containing any type of consumable substance, such as frozen alcohol beverages. The mould cavity or of the freezing cell has a deep or a height which typically varies based on the desired volume of the frozen fluids or food to be obtained. The removable mould or freezing module or the removal facilitating mold as called throughout, comprising the freezing cells, would preferably be made from a material supporting extremely cold temperatures or large temperature differences and being thermally conductive.

According to the principle of the present invention, different control means using a thermometer unit may be used to maintain a temperature allowing the present fluid to be frozen. In the event where the freezing fluid is liquid nitrogen, a control means must ensure that the level of liquid nitrogen is maintained to a level allowing the present fluid to be frozen. In another embodiment, the temperature of the different mould cavities or freezing cells may be electronically controlled. In further embodiments, the apparatus may comprise manual controls, such as a valve, to vary the temperature and freezing fluid output level. In such an embodiment, a user may, as needed, open the valve of the freezing fluid injection system until the main frame has reached the appropriate temperature.

Similarly, the operator may adjust the freezing fluid injection system output to provide a minimum fluid output enabling the freezing chamber of the apparatus to maintain a constant temperature. Having a higher debit of freezing fluid pulls out the heat. Such heat removal generates more cold and thus provides quicker time duration for freezing the substance. When a lower debit of freezing fluid is provided, the freezing time duration is longer but it allows the fluid tank to freeze more freezing cells.

In accordance with the principles of the present invention, in another embodiment, the apparatus may comprise a sensor controlling and monitoring the level of freezing fluid present within the freezing chamber. Such sensor may allow the automatic actuation of the valve controlling the volume per second of freezing fluid outputted from the injection system.

In accordance with the principle of the present invention, the temperature of the main frame may be controlled manually or electronically. The flux of the fluid used to freeze consumable fluids or food is typically relative to the level of coldness of the main frame but further control the hardness of the final frozen or iced product. Similarly, such hardness of the frozen product may also be controlled by the idling duration of the fluid to be frozen within the mould of the mainframe. After the freezing time has lapsed, the removal facilitating mold or the freezing cells are generally removed from the main frame freezing chamber. Similarly, a release mechanism allowing the release of the frozen substance from the mould may be integrated to the apparatus. Using such release mechanism, the frozen product is collected and removed by the user before being served to the clients.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 7 is a front view of a second embodiment of freezing cells of the instant freezer apparatus of FIG. 1.

FIG. 8 is a side view of the second embodiment of the freezing cells of the FIG. 7.

FIG. 9 is a bottom view of the second embodiment of the freezing cells of FIG. 7.

FIG. 29 is a top view of a ventilation cap of the instant freezer apparatus of FIG. 21.

FIG. 31 is a side view of the ventilation cap of FIG. 29.

FIG. 33 is a perspective view of the ventilation cap of the instant freezer apparatus of FIG. 21.

FIG. 40 is a top view of a holder cover of the instant freezer apparatus of FIG. 21.

FIG. 41 is a front view of the holder cover of the instant freezer apparatus of FIG. 21.

FIG. 42 is a bottom view of the holder cover of the instant freezer apparatus of FIG. 21.

FIG. 43 is a side view of the holder cover of the instant freezer apparatus of FIG. 21.

FIG. 44 is a perspective view of the holder cover of the instant freezer apparatus of FIG. 21.

FIG. 61 is a perspective view of a top injector of the injecting assembly of the instant freezer apparatus of FIG. 51.

FIG. 62 is a front view of a top injector of the injecting assembly of the instant freezer apparatus of FIG. 51.

FIG. 63 is a side view of a top injector of the injecting assembly of the instant freezer apparatus of FIG. 51.

FIG. 84 is a perspective view of a fourth embodiment of an instant freezer apparatus in a closed position according to the principles of the present invention.

FIG. 85 is a front view of the instant freezer apparatus of FIG. 84.

FIG. 86 is a top view of the instant freezer apparatus of FIG. 84.

FIG. 87 is a perspective view of the fourth embodiment of an instant freezer apparatus in an open position according to the principles of the present invention.

FIG. 88 is a front view of the instant freezer apparatus of FIG. 87.

FIG. 89 is a top view of the instant freezer apparatus of FIG. 87.

DETAILED DESCRIPTION OF THE PREFERRED EMBODIMENT

A novel instant freezer apparatus and method of doing the same will be described hereinafter. Although the invention is described in terms of specific illustrative embodiments, it is to be understood that the embodiments described herein are by way of example only and that the scope of the invention is not intended to be limited thereby.

Figure 15:
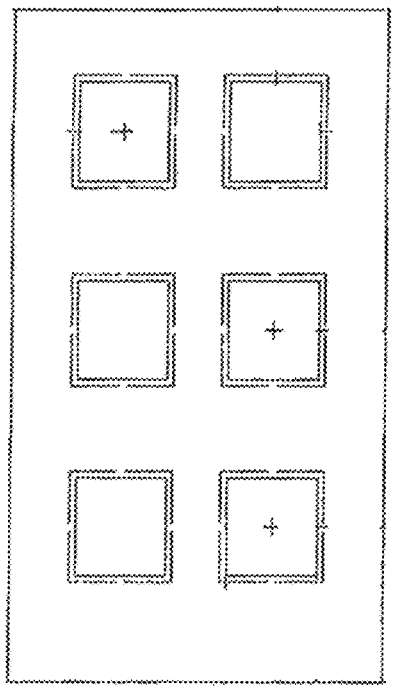
FIG. 15 is a top view of the removal facilitating mold of FIG. 13.
Figure 14:
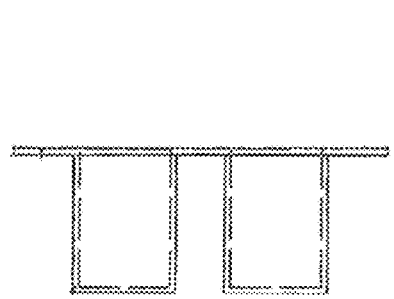
FIG. 14 is a side view of the removal facilitating mold of FIG. 13.

Now referring to FIGS. 1 to 20, a first preferred embodiment of an instant freezer apparatus 2 is shown. The instant freezer apparatus generally comprises a main frame 8 and a removable module 80, referred herein after as a removal facilitating mold (FIGS. 13-15). The main frame 8 comprises a freezing chamber 10 connected to a ventilating exit 12 by an intersecting wall 6.

The freezing module 10 is typically shaped as a cuboid, a parallelepiped or a rectangular prism having 6 faces or walls. Understandably, any other shape adapted to contain a substance to be frozen, such as liquid substance, may be used without departing from the principles of the present invention. The freezing module 10 comprises a top surface 34 comprising at least one freezing cell 18 downwardly extending from the top surface 34 in a way to form a pocket adapted to receive fluids or consumable food to be frozen. In the present preferred embodiment, the freezing module 10 comprises six freezing cells 18 split in two rows of three cells. Such a freezing module 10 and freezing cells 18 may have a wide variety of shapes. In the present embodiment, the freezing cells 18 are typically shaped as open cuboids or parallelepipeds but could also embody custom shapes as required by the customer. The volume of each freezing cell 18 must generally match the volume of the fluid to be frozen. As an example, a 40% volume/volume alcohol drink would typically be frozen in a one to one and a half ounce (30 to 45 ml) protrusion 18. The remaining interior of the freezing chamber 10 is empty and is used as a freezing cavity 20.

The main frame 8 also typically comprises a ventilating exit 12 connected to the freezing module 10 with an intersecting wall 6. The ventilating exit 12 is typically fluidly connected with the freezing module 10 by at least one small opening or apertures 38 located on the intersecting wall 6 of the freezing module 10 and the ventilating exit 12. The size and number of openings 38 fluidly connecting the freezing module 10 and the ventilating exit 12 generally depend, not only on the size of the freezing cavity 20 of the freezing module 10 but also on the volume of the freezing fluid normally required for cooling down the freezing cells 18. As such, in the present preferred embodiment, the openings 38 have very small areas thereby optimizing the fluid retention in the freezing cavity 20. This fluid isolation provided by the openings 38 will typically increase the duration for which the freezing module 10 maintains a low temperature while minimizing the volume of the freezing fluid required.

The configuration of the openings 38 connecting the ventilating exit 12 to the freezing module 10 may vary from one embodiment to the other. One skilled in the art shall understand that the openings 38 may be located on any other face of the freezing module 10, as long as the openings 38 ventilate the gases from the freezing module 10.

Understandably, the ventilating exit 12 may be further configured as a separate section of the main frame 8. In such a configuration, the ventilating exit 12 typically comprise holes or apertures of different dimensions positioned to optimize the volume of the required freezing fluid, either liquid carbon dioxide or liquid nitrogen, allowed to exit the freezing module 10. The ventilating exit 12 should further be interchangeable and should have a size compatible with the size of the freezing module 10.

Understandably, once the instant freezer apparatus is adapted to be used with a liquid carbon dioxide, the intersecting wall 6 and the apertures 38 are essentially configured to retain the carbon dioxide inside the freezing module 10. In fact, once injected in liquid form into the freezing module 10, the liquid carbon dioxide transforms into snow-like substance inside the freezing module 10 as the pressure of the carbon dioxide decreases. Thus, the form and the size of the intersecting wall 6 and the apertures 38 are adapted to prevent the generated snow-like substance from exiting the freezing chamber 10. The snow-like substance resulting of the injection of liquid carbon dioxide aims at maintaining the low temperature inside the freezing module 10.

Figure 1:
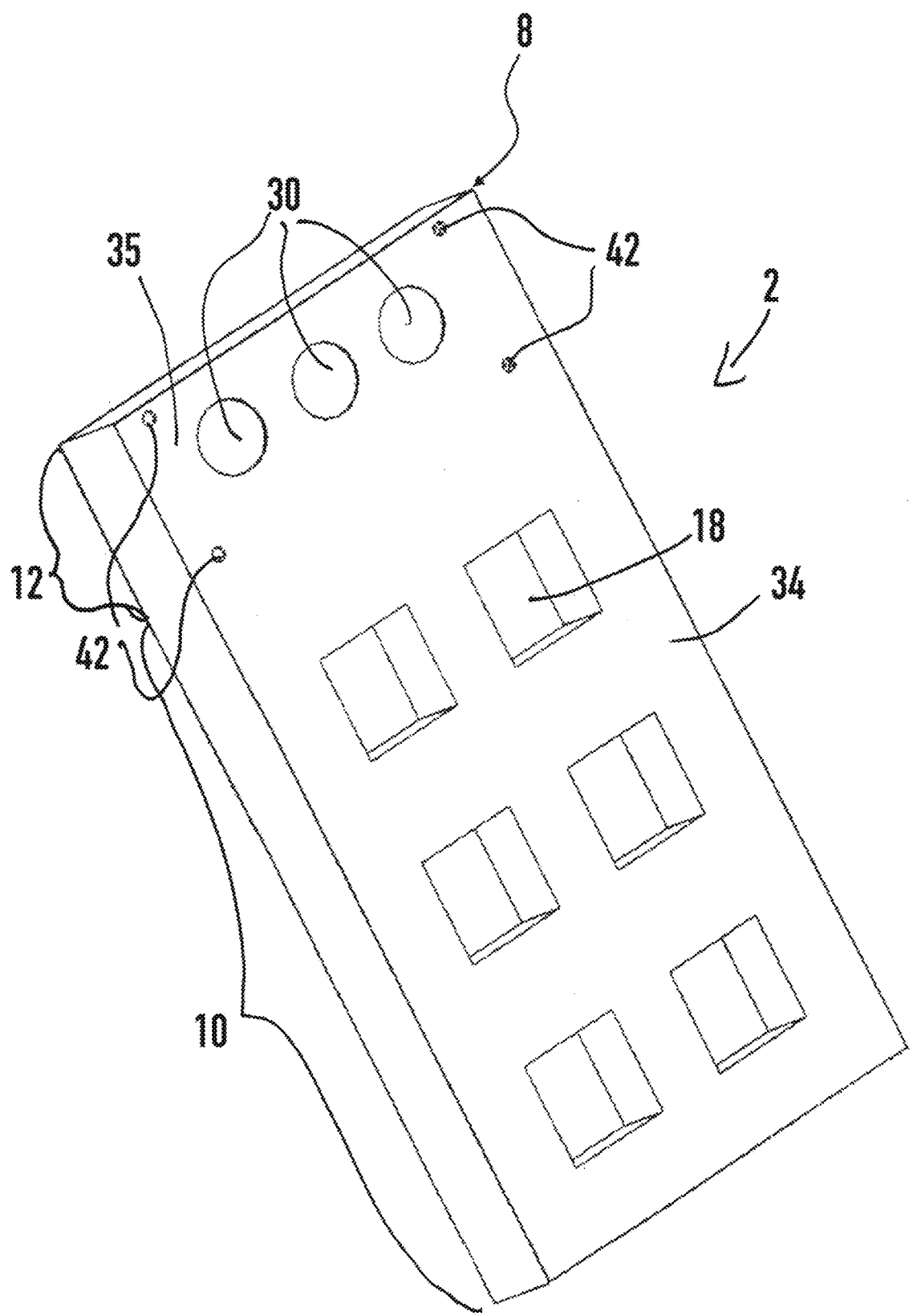
FIG. 1 is a perspective view of an instant freezer apparatus according to the principles of the present invention.
Figure 2:
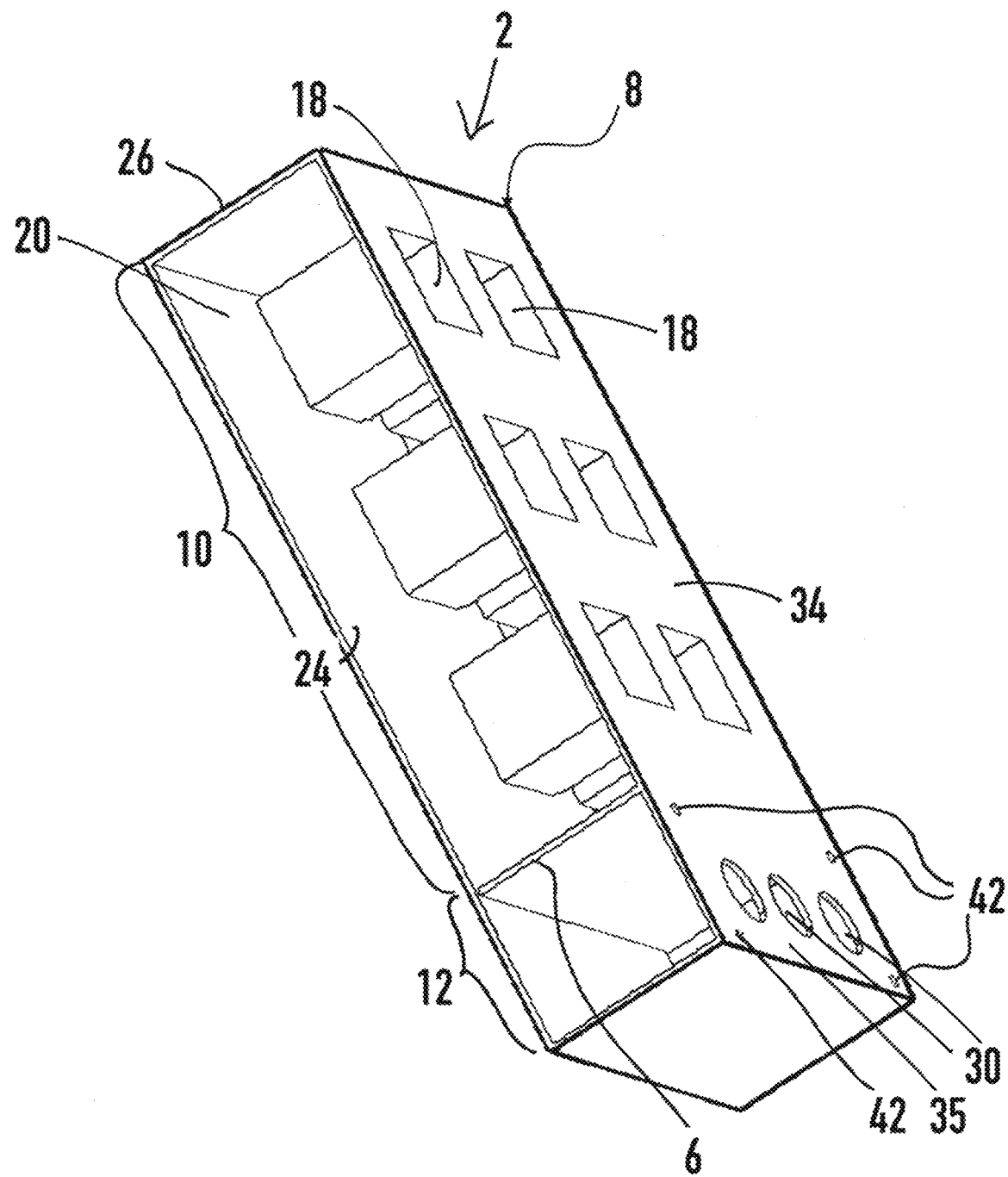
FIG. 2 is a cross sectional perspective view showing inner portions of the instant freezer of FIG. 1.
Figure 3:
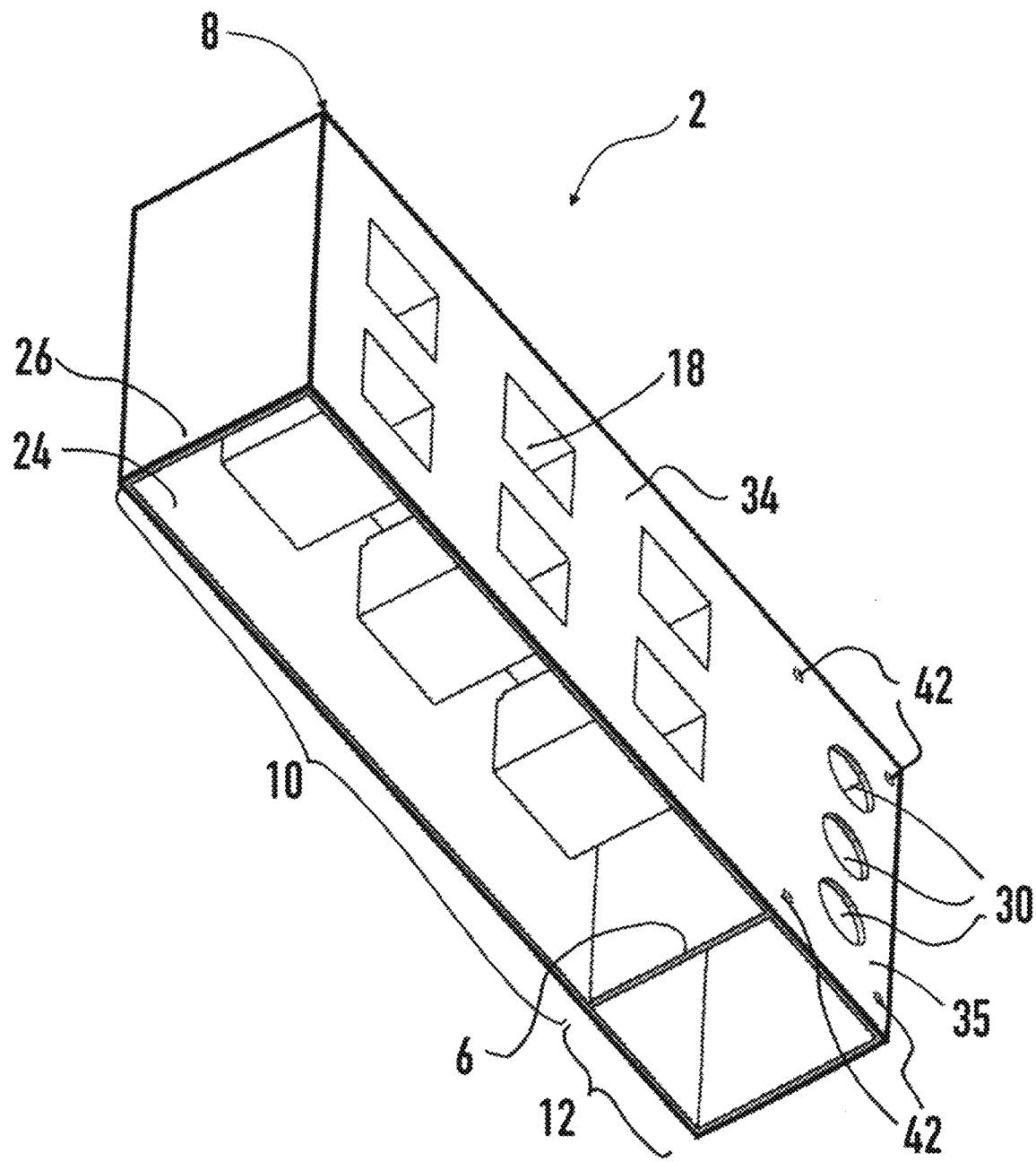
FIG. 3 is a cross sectional perspective view showing inner portion of the instant freezer of FIG. 1.
Figure 6:
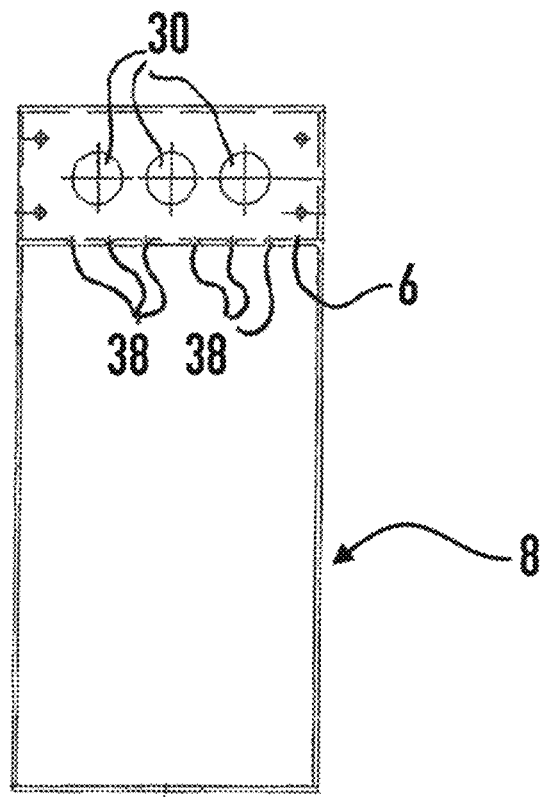
FIG. 6 is a top view of the instant freezer of FIG. 1 showing a second embodiment of the ventilating exit.
Figure 5:
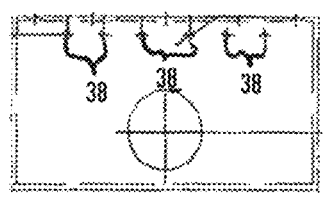
FIG. 5 is a top view of a first embodiment of a ventilating exit of the instant freezer having openings fluidly connecting a freezing chamber to the ventilating exit.
Figure 4:
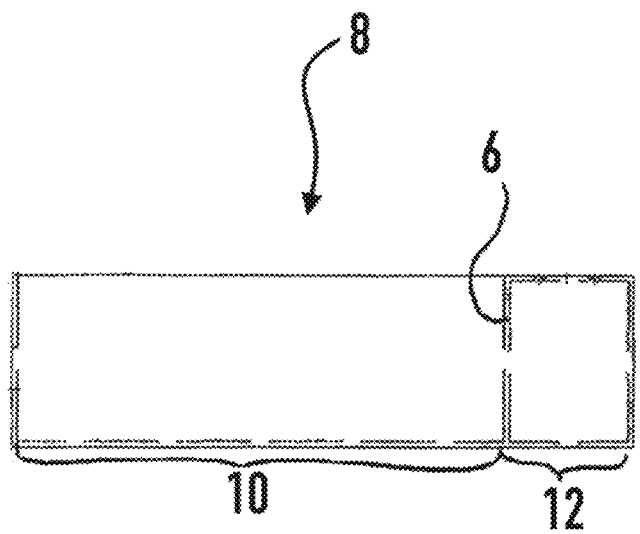
FIG. 4 is a side view of a main frame of the instant freezer apparatus of FIG. 1.
Figure 12:
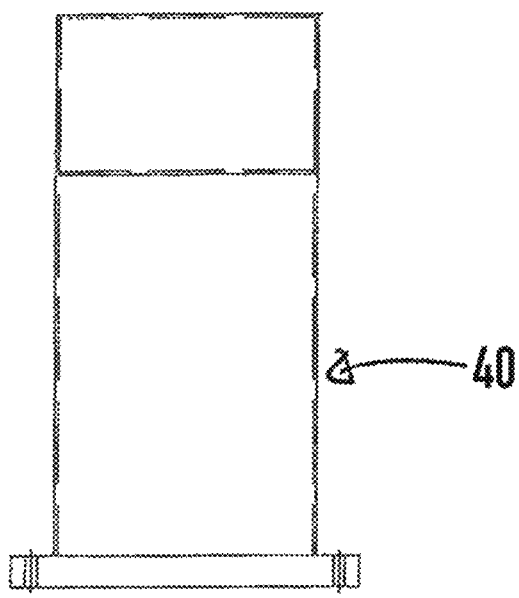
FIG. 12 is a front view of the chimney of the instant freezer apparatus according to the principles of the present invention.
Figure 11:
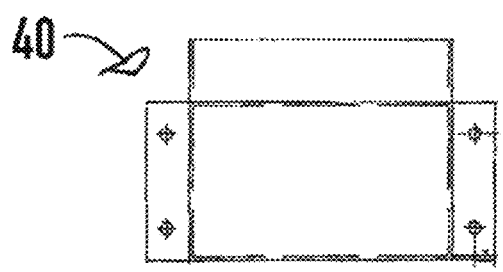
FIG. 11 is a top view of the chimney of the instant freezer apparatus according to the principles of the present invention.
Figure 10:
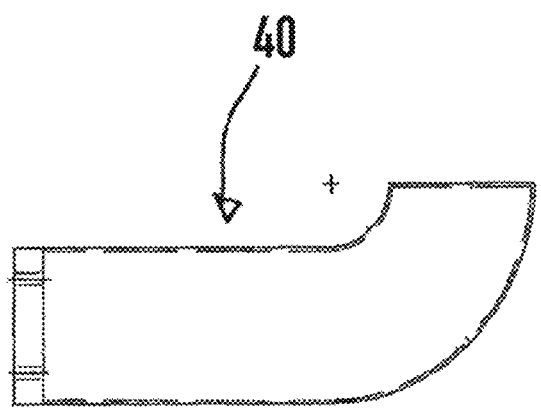
FIG. 10 is a side view of a chimney of the instant freezer apparatus according to the principles of the present invention.
Figure 13:
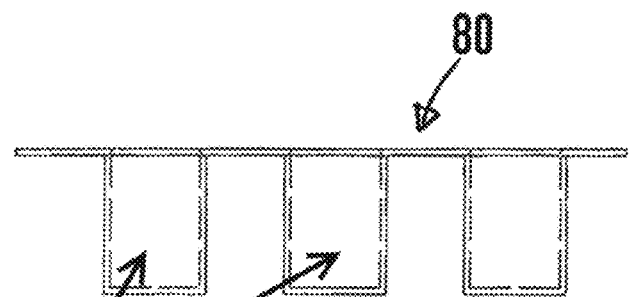
FIG. 13 is a front view of a removal facilitating mold of the instant freezer apparatus showing freezing cells.
Figure 16:
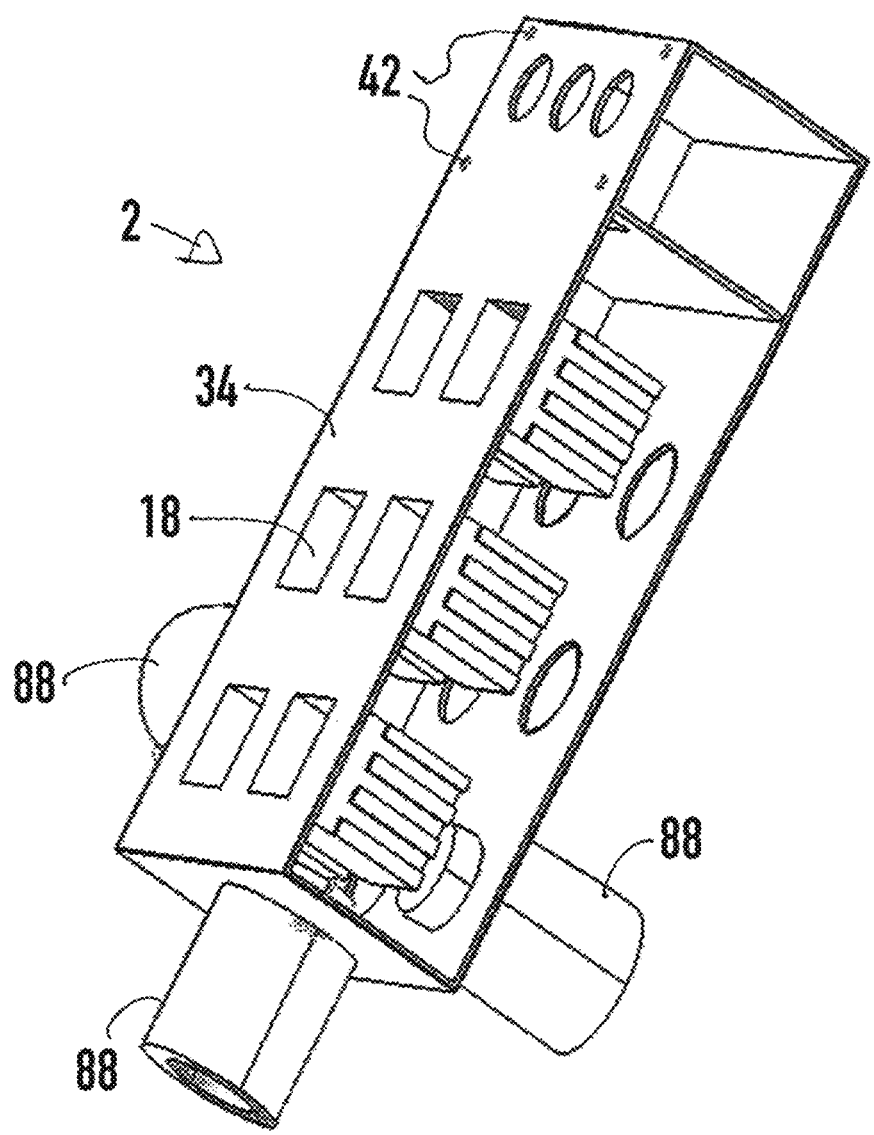
FIG. 16 is a perspective view of the instant freezer apparatus showing injector openings and an inner part of the instant freezer apparatus.
Figure 17:
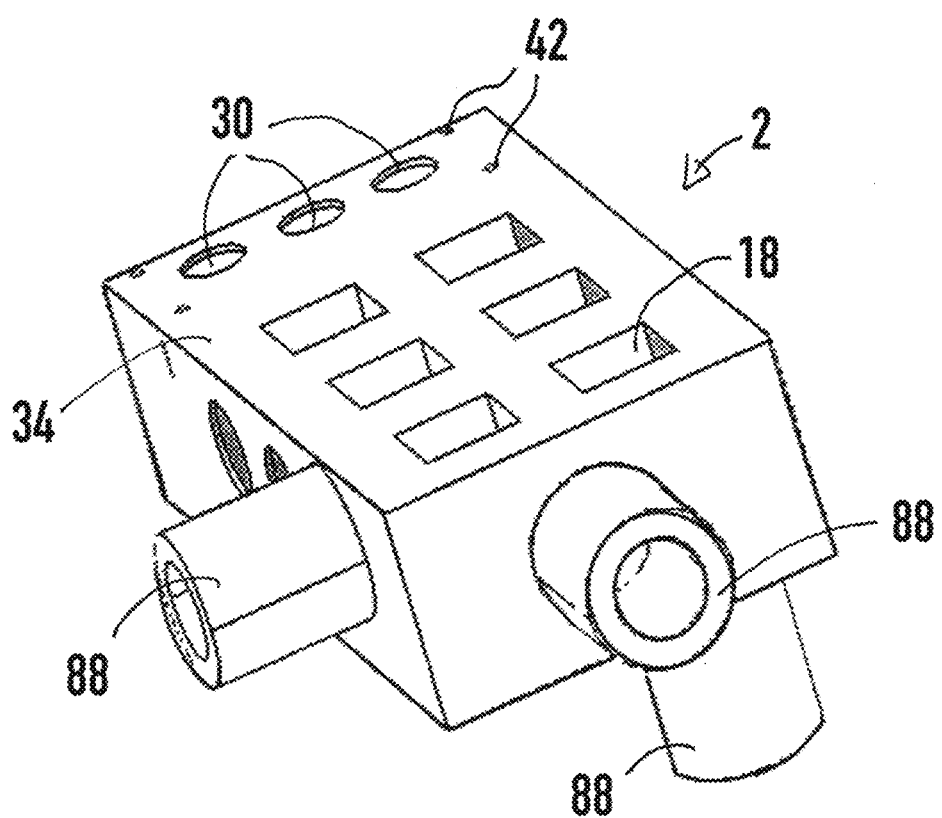
FIG. 17 is a perspective view of the instant freezer apparatus showing injector openings.
Figure 18:
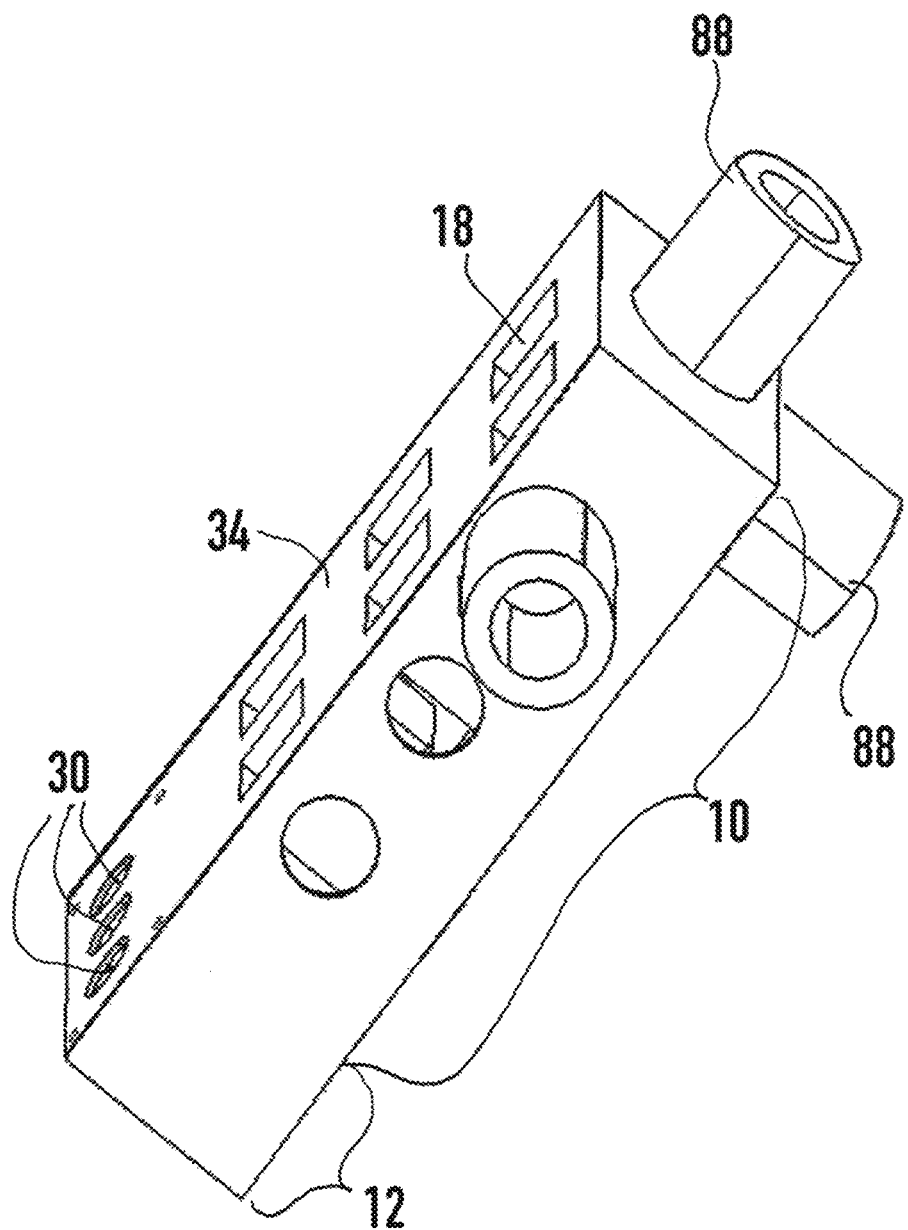
FIG. 18 is a perspective view of the instant freezer apparatus showing injector openings.
Figure 19:
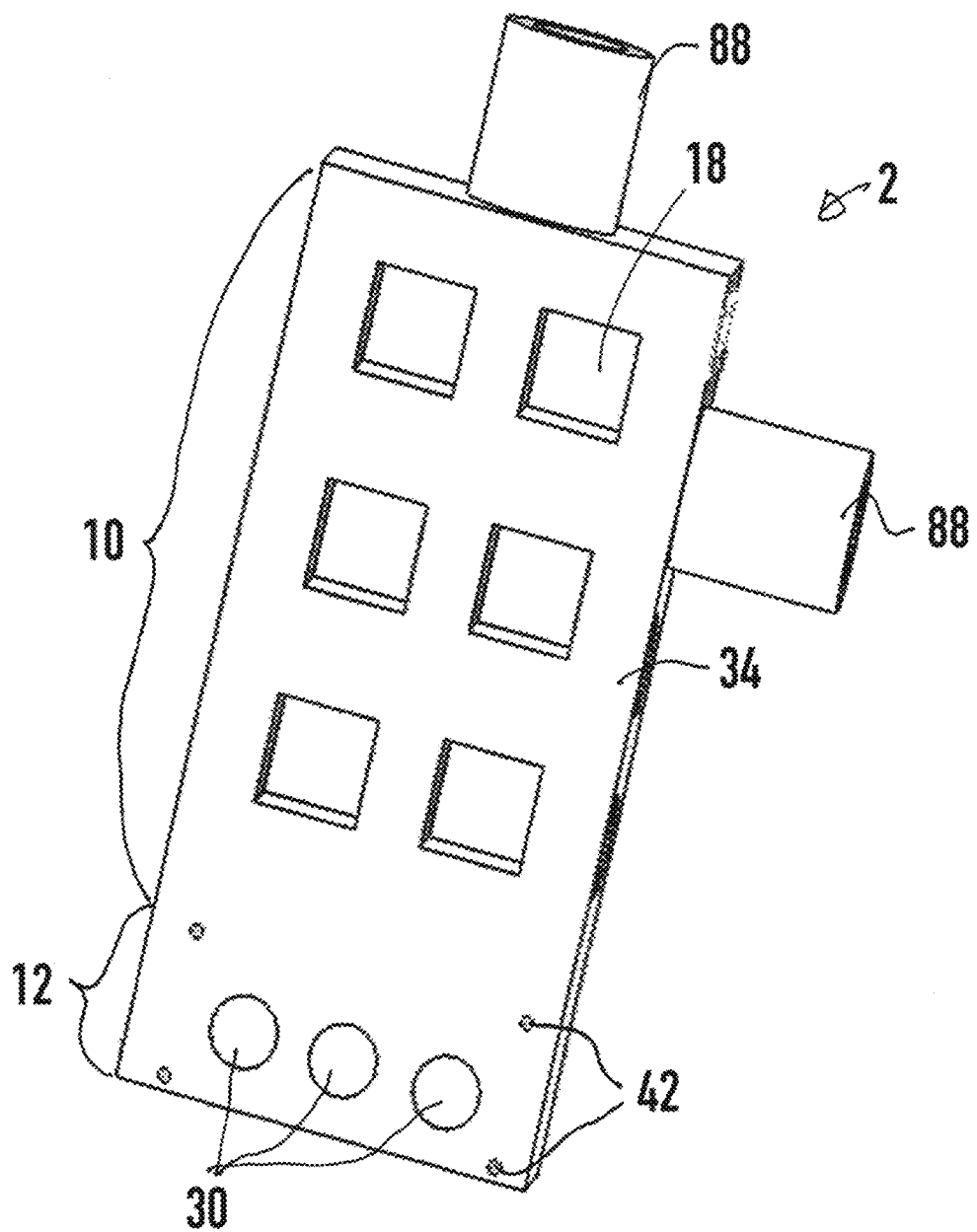
FIG. 19 is a top angled view of the instant freezer apparatus showing injector openings.
Figure 20:
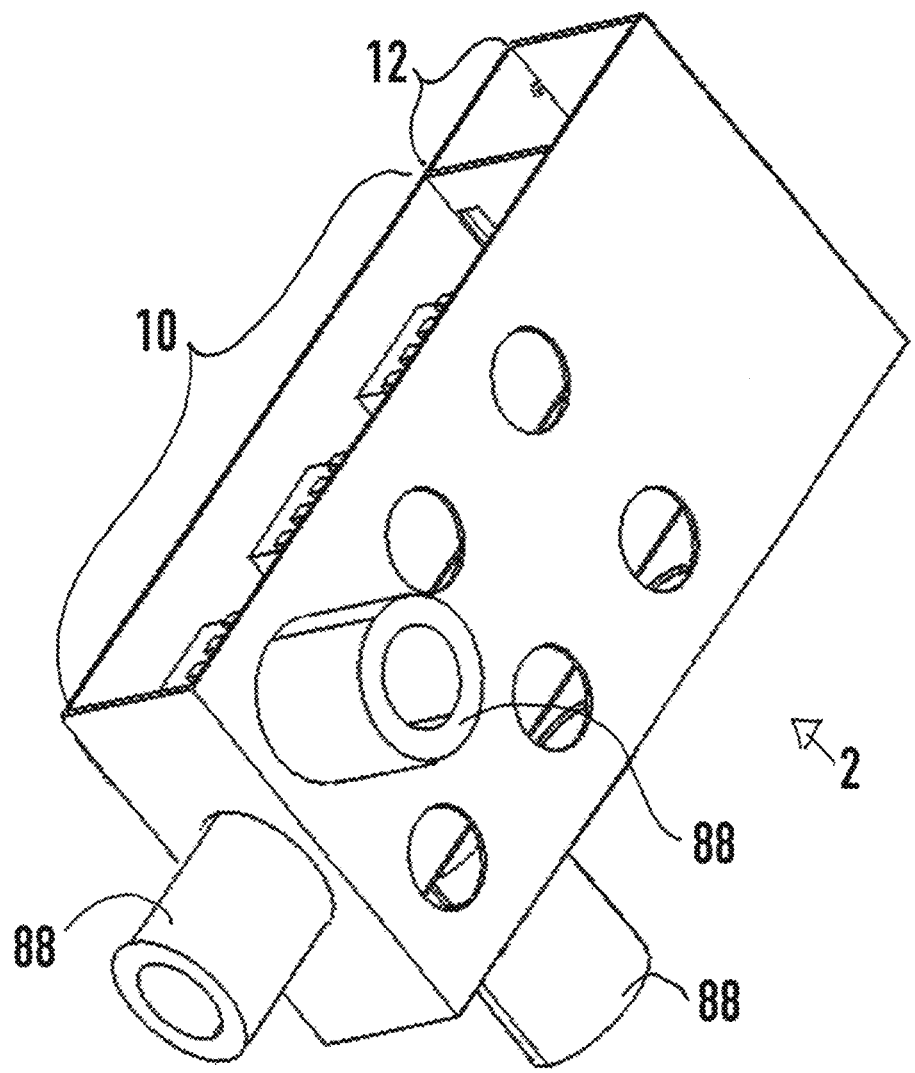
FIG. 20 is a bottom-angled view of the instant freezer apparatus showing injector openings.

In yet a first preferred embodiment, for a heavily used instant freezer, the ventilating exit 12 may comprise a chimney 40 as illustrated by FIGS. 10 to 12. The chimney 40 is configured to divert the flow of fluid between the freezing module 10 and ventilating exit 12.

The chimney 40 typically prevents the asphyxiation of the users of the device. The chimney 40 is generally fastened to the ventilating exit 12 through compatible openings 42 located on the top surface 35 of the ventilating exit and designed to accommodate such a chimney 40. Understandably, light use of the device will not generate enough gas to asphyxiate a user. However, the continuous use of the device in a closed space may deprive the user, such as a bartender, from enough oxygen. As such, for security purposes, the ventilating exit 12 typically divert the exiting nitrogen or carbon dioxide airflow away from the user. The gas is typically expelled through ventilating openings 30 generally located in the top wall 35 of the ventilating exit 12. In other embodiments adapted for restrained area, the ventilating exit 12 may be connected to a ventilation system expelling the resulting frozen fluid or snow-like substance outside of the area.

Understandably, the ventilating openings 30 could as well be located on another wall of the ventilating exit 12 as could possibly be located in the one of the walls 26 of the freezing cavity 20 or to the bottom portion 24 of the freezing cavity 20.

Now referring to FIGS. 13-15, an embodiment of the instant freezer apparatus further comprising a removal facilitating mold 80 is shown. The removal facilitating mold 80 is typically moulded to the shape of the freezing cells of the freezing module 10 so that the protrusions 81 of the removal facilitating mold 80 matches the shape of the freezing cells 18. In such an embodiment, the removal facilitating mold is located on top of the freezing cells 18 and of the freezing module 10. When the user is ready to initiate the freezing of a fluid poured in the freezing cell 18, the user typically opens the gas tank valve, lays down the removal facilitating mold 80 on the freezing module 10 and pours the fluid in the moulded removal facilitating mold 80. The user waits for the shots to be frozen. The waiting time typically ranges from less than a minute to about five minutes depending on the coldness of the apparatus. Once the poured fluid is frozen, the user may remove the removal facilitating mold 80 from the freezing module 10 and may extract the frozen product from the removal facilitating mold.

Understandably, instead of the removal facilitating mold, the instant freezer apparatus may comprise a thin layer, such as a polymer sheet. The thin layer is typically inserted prior to pouring liquid input in the freezing cells. Such thin layer aims at easing the removal of the frozen product from the freezing cells. When the poured liquid is frozen, the frozen product may be removed by simple lifting the thin layer.

In a further similar configuration, the use of some specific polymer sheets may make easier the removal of the frozen substance. Thus, if the frozen substance does not adhere to the surface of the polymer sheet, the frozen product may be directly removable without having a need to remove the polymer sheet.

Now referring to FIGS. 7-9, a second embodiment of freezing cells 18A of the freezing module 10 is shown. The internal walls 50 and the bottom portion 52 of the freezing cells 18A are made with a plurality of protruding members 55. In such an embodiment of the freezing cells, the plurality of protruding members 55 aims at increasing the efficiency of the instant freezing apparatus and of the method of instantly freezing the desired fluid or food. The increased efficiency is typically due to the larger contact area between the internal wall of the freezing medium and the freezing fluid.

Generally, the number of freezing cells may vary from the type of embodiment according to the intended use of the device. For instance, in a smaller venue, it would be possible to restrain the number of freezing cells 81 between 1 and 6. In larger venues or events, the apparatus may comprise a higher number of freezing cells 81, such as 6 to 12 or even more freezing cells 81. In an embodiment comprising more than 6 freezing cells 81, the removal facilitating mold 80 may be made with more than one section. Accordingly, each section may be lifted by a different user thus easing the usage of the apparatus by a plurality of users. Similarly, the one or more sections of the removal facilitating mold 80 may allow a user to serve a first order while a second order is maintain to a freezing temperature Now Referring to FIGS. 16 to 20, an embodiment of an instant freezer apparatus adapted to be used with a freezing fluid source is illustrated. In such a configuration, the freezer apparatus 2 further comprises at least one injector, either integrated or attached, to either one of the side walls 26 or the bottom surface 24 of the freezing cavity 20. The injector openings 88 are preferably located in close proximity to the sidewalls or to the bottom surface of the freezing cells 18.

The number of activated injectors generally varies as a function of the number of fluids or consumable food to be frozen in the apparatus and/or in function to the number of freezing cell 81 comprised in the apparatus. When freezing a single shot, a single injector may be activated. In the embodiment allowing the freezing of six shots, all the injectors are activated. In a further embodiment, one or more injectors may be individually directed to a single freezing cell 81.

Now referring to FIGS. 21-49, a second embodiment of an instant freeze apparatus 102 is shown. Now referring to FIG. 21, the instant freeze apparatus generally comprises a main frame 108 and a removable freezing module 110, hereinafter referred as a cell holder (See FIGS. 34-39). The main frame 108 comprises a freezing chamber 120 fluidly connected to at least one ventilating exits 112. In the present preferred embodiment, the freezing chamber 120 is fluidly connected to at least two ventilating exits 112 and 112'. The main frame 108 may further comprise a support structure 172 for supporting the freezing chamber 120 at a desired height. One skilled in the art shall understand that any other means for holding the instant freeze apparatus 102 may be used.

Now referring to FIGS. 24 to 28, the second embodiment of the instant freeze apparatus is shown. The main frame 108 is typically shaped as an elongated U or rectangular prism having the extremities 111, 111' of the prism upwardly bent. The main frame 108 comprises two side surfaces 142 and 144, an upper surface 146 and a lower surface 147. The upper surface 146 comprises an aperture 121 adapted to receive the removable freezing module 110.

Still referring to FIGS. 24 to 28, the main frame 108 further comprises ventilating exits or chimneys 112 and 112'. In this second preferred embodiment, the ventilating exits are an integral part of the freezing chamber 120. As such, the freezing chamber 120 comprises a U-shaped prism. The ventilating exits 112, 112' are fluidly connected with the freezing chamber 120 by at least one opening or aperture 138 located on an intersecting wall 106 (see FIG. 45) of the freezing chamber 120 and of the ventilating cavity 122.

Figure 21:
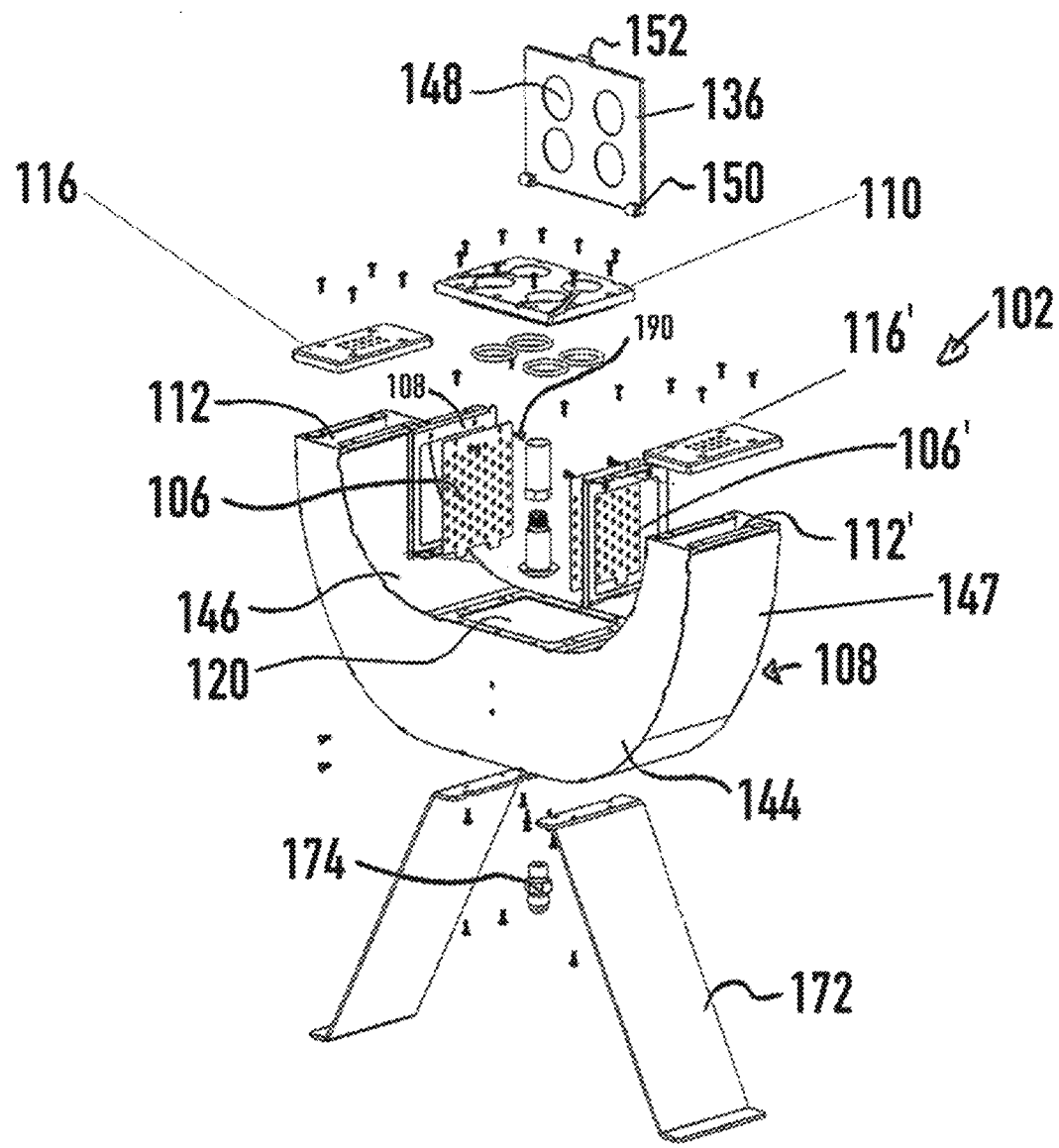
FIG. 21 is an exploded perspective view of a second embodiment of an instant freezer apparatus according to the principles of the present invention.
Figure 45:
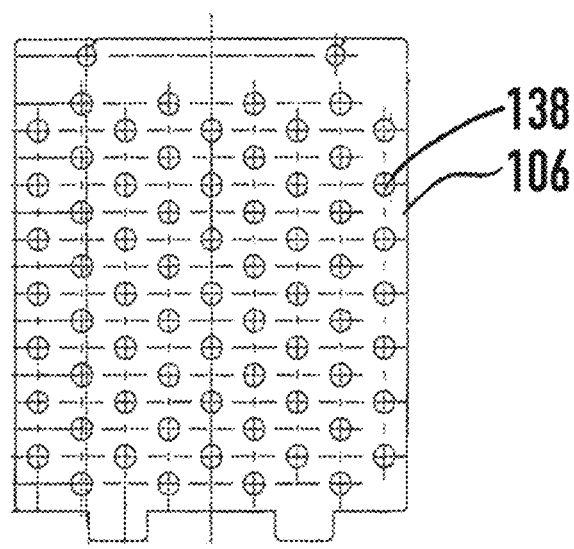
FIG. 45 is a front view of an intersecting wall of the instant freezer apparatus of FIG. 21.
Figure 48:
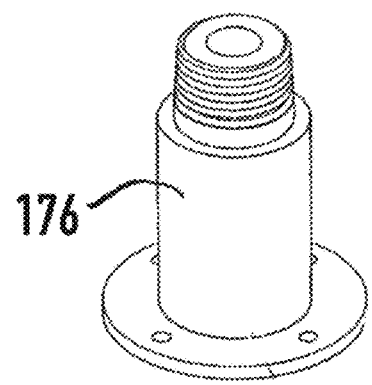
FIG. 48 is a perspective view of the middle injector of the instant freezer apparatus of FIG. 21.
Figure 46:
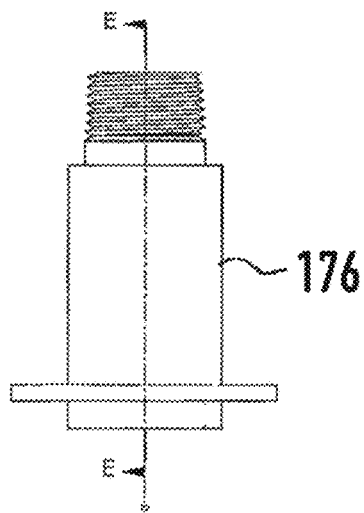
FIG. 46 is a side view of a middle injector of the instant freezer apparatus of FIG. 21.
Figure 47:
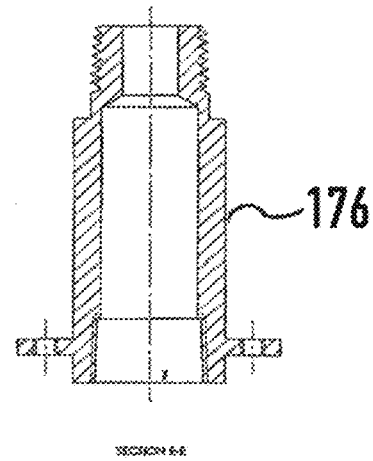
FIG. 47 is a cross sectional view along axis E-E of the middle injector of FIG. 46.
Figure 49:
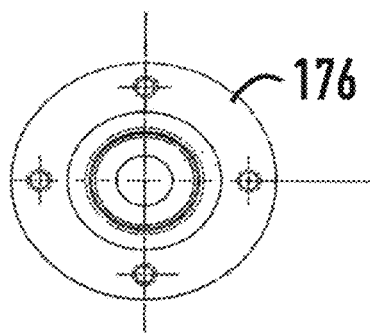
FIG. 49 is a top view of the middle injector of the instant freezer apparatus of FIG. 21.
Figure 50:
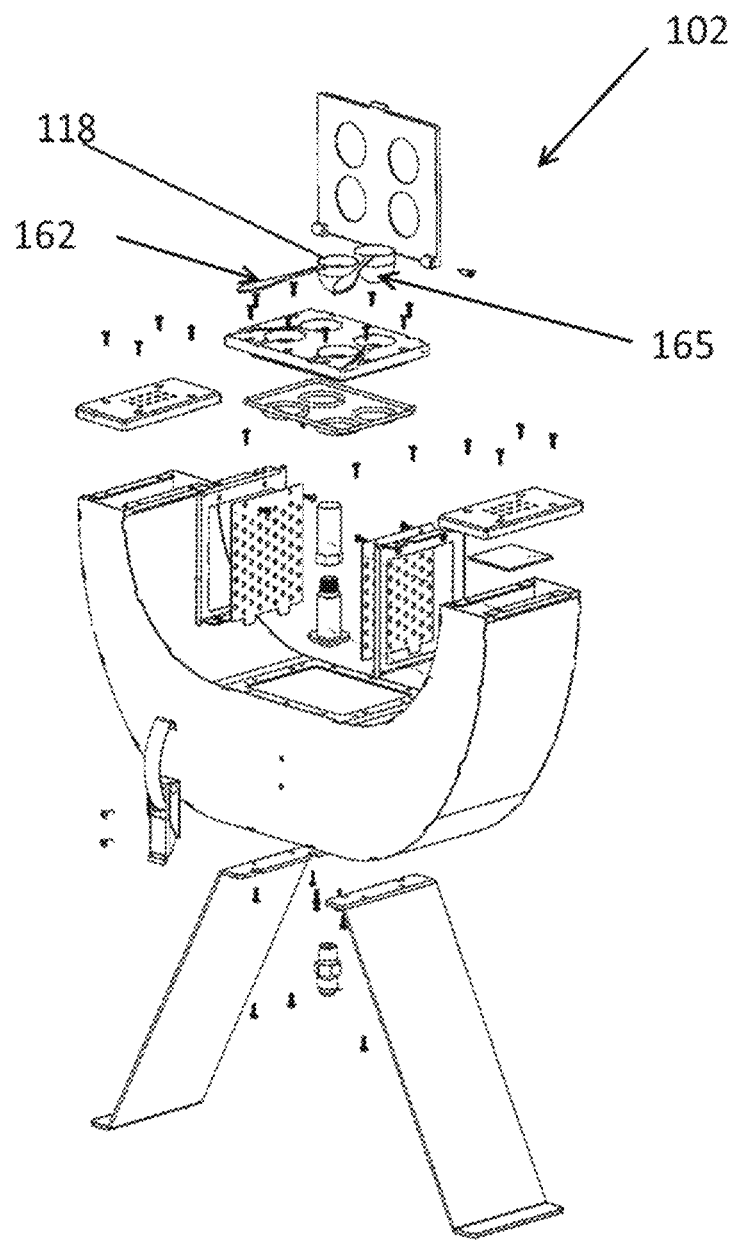
FIG. 50 is an exploded perspective view of an embodiment of the instant freezer apparatus according to the principle of the present invention.

Now referring to FIGS. 45, 21 and 50, the intersecting wall 106 is configured to be received in an intersecting frame element 168. As such, the intersecting wall 106 is generally mounted to the intersecting frame element 168 via fasteners 190. Consequently, it is thus possible to interchange the intersecting wall 106 depending in the intended use of the instant freezing apparatus 102. The intersecting wall 106 may thus be replaced with an intersecting wall 106 having opening of differing sizes to optimise the freezing efficiency of the instant freezing apparatus 102.

Understandably, the size and number of openings 138 fluidly connecting the freezing chamber 120 to the ventilating cavity 122 or 122' generally depend, not only, on the size of the freezing chamber 120 but also on the required volume of fluid for cooling down the freezing cells 118 (FIG. 50). As such, in the preferred embodiment, the openings 38 have very small areas thereby optimizing the fluid retention in the freezing chamber 120 while allowing superfluous gas to escape via the exits 112. This gas isolation provided by the openings 138 typically increases the duration for which the freezing chamber 120 maintains a low temperature while minimizing the volume of the freezing fluid required.

Now referring back to FIGS. 29 to 33, in the second preferred embodiment, the ventilating exits 112, 112' may further comprise ventilation openings 114 for channelling the exiting fluid. The ventilation openings 114 may be integrated in a ventilation cap 116. The size and number of openings 114 fluidly connecting the ventilation exits 112, 112' to the exterior generally depend, not only, on the size of the freezing chamber 120 but also on the volume of the freezing fluid normally required for cooling down the freezing cells 118. As such, in the present preferred embodiment, the openings 114 have very small areas thereby optimizing the gas retention in the freezing chamber 120. This gas isolation provided by the openings 114 will typically increase the duration for which the freezing chamber 120 by further increasing the retention of gas in the ventilation cavity 122 or 122' and acting as insulation to maintain a low temperature in the freezing chamber 120 while minimizing the volume of the freezing fluid required.

Understandably, the configuration of the openings 114 on the ventilating exit 112 may vary from one embodiment to the other. One skilled in the art shall understand that the openings 114 may be located on any other face of the freezing chamber 120, as long as the openings 114 ventilate the gases from the freezing chamber 120.

Understandably, once the instant freezer apparatus is adapted to be used with liquid carbon dioxide, the intersecting wall 106, the apertures 138 and the openings 114 may be configured to retain the solid carbon dioxide inside the freezing chamber 120. In fact, once injected to the freezing chamber 120, the liquid carbon dioxide transforms into kind of solid carbon dioxide or snow-like substance inside the freezing chamber 120. Thus, the form and the size of the intersecting wall 106, the apertures 138 and the openings 114 are adapted to prevent the snow resulting of the injection of liquid carbon dioxide from exiting the freezing chamber 120. The snow-like substance resulting of the injection of liquid carbon dioxide maintains the low temperature inside the freezing chamber 120.

According to the second embodiment, now referring to FIGS. 22-24 and 50, the instant freeze apparatus 102 comprises freezing cells 118 which are typically removable from the removable freezing module 110, referred herein to as a cell holder. In such an embodiment, the freezing cells 118 are embodied as spoons. Each freezing cell comprises a handle 162 supporting at one end a receptacle 165 preferably shaped as a cylindrical or combination of hemispherical and cylindrical elements. The handle 162 is configured to ease the insertion and removal of the individual freezing cells 118 from the cell holder 110. The cell holder 110 is typically embodied as a plate holder having holder openings 160 about the size of the freezing cells 118 and configured to receive said freezing cells 118. In yet another embodiment, the freezing cells may be shaped in other forms or geometries.

Still referring to FIGS. 34 to 39, the removable module 110, referred herein to as a cell holder, is shown. The cell holder 110 comprises grooves 164, 164', 164'', 164''' adapted for receiving a portion or the entirety of the handle 162 of a freezing cell 118 (see also FIGS. 67-69). As such, when in use, the freezing cell 118 is received in the holder opening 160 with a corresponding handle 162 received in the corresponding groove 164. Accordingly, the cell holder 110 is configured to be in closed portion, unhindered by the freezing cells 118 and their respective handles 162. In such a configuration, the cell holder 110 retains the freezing cells 118 in position during use of the instant freezing apparatus 102 despite the increased gas pressure generated from the freezing chamber 120.

In this preferred embodiment, the removable freezing module 110 comprises four openings 160 split in two rows of 2 openings. Such openings 160 may have any shape which is compatible with the shape of the freezing cells. In the present embodiment, the openings 160 are typically shaped as open cylindrical or combination of hemispherical and cylindrical elements (see FIGS. 34 to 39) but could also be shaped as any custom shape as required by the use.

Understandably, the volume of each freezing cell 118 generally matches the volume of the fluid or element to be frozen. As an example, a 40% volume/volume alcohol drink would typically be frozen in a half ounce (15 ml) freezing cell 118. Referring back to FIGS. 34 to 39, the cell holder 110 is preferably mounted on the open portion 121 of the freezing chamber 120 to mate, preferably to sealingly mate, with the main frame upper wall 146 and side walls 142, 144. The cell holder 110 may be covered using a holder cover 136.

Now referring to FIGS. 40 to 44, in a preferred embodiment, the holder cover 136 is pivotally connected to the cell holder 110 for securing the freezing cells 118 therein without being removable from the apparatus 102. Such cover 136 shall be made of material resisting to extremely cold temperatures and large temperature differences. The holder cover 136 is generally embodied as a plate having openings 148 and a pivot mechanism 150, such as hinges, attached to the cell holder 110. The cover 136 may further comprises a protrusion 152 on the side opposite to the pivot mechanism 150 to ease in securing the holder cover 136 on the cell holder 110 when the freezing cells 118 are inserted thereto.

Figure 24:
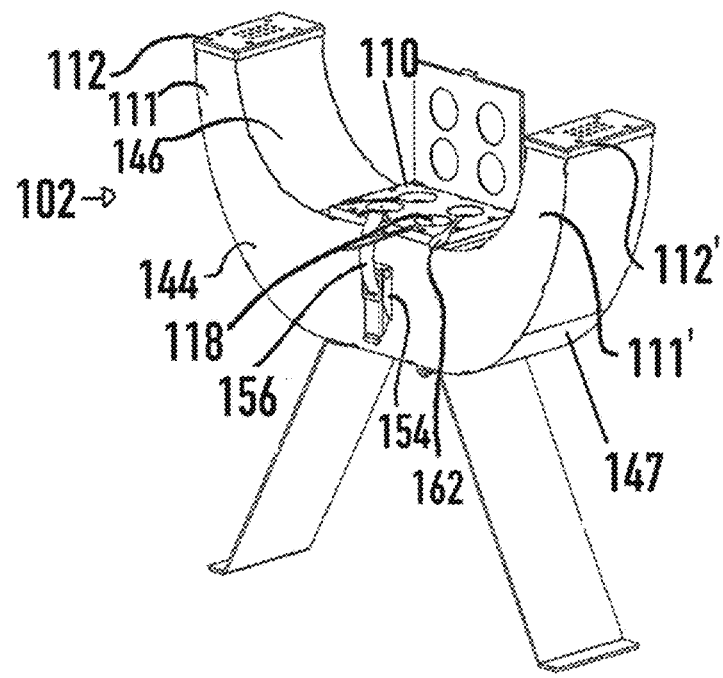
FIG. 24 is a perspective view of the instant freezer apparatus of FIG. 21 in an open position.

Now referring to FIG. 24, the instant freezer apparatus may further comprise a latch mechanism 154 (FIG. 24) for securing the holder cover 136 to the apparatus 102 via the protrusion 152. In use, the latch element 156 of the latch mechanism 154 secures the closed holder cover 136 via the protrusion 152. Understandably, any other mean for securing the holder cover 136 to the apparatus 102 may be used.

Figures 22, 23:
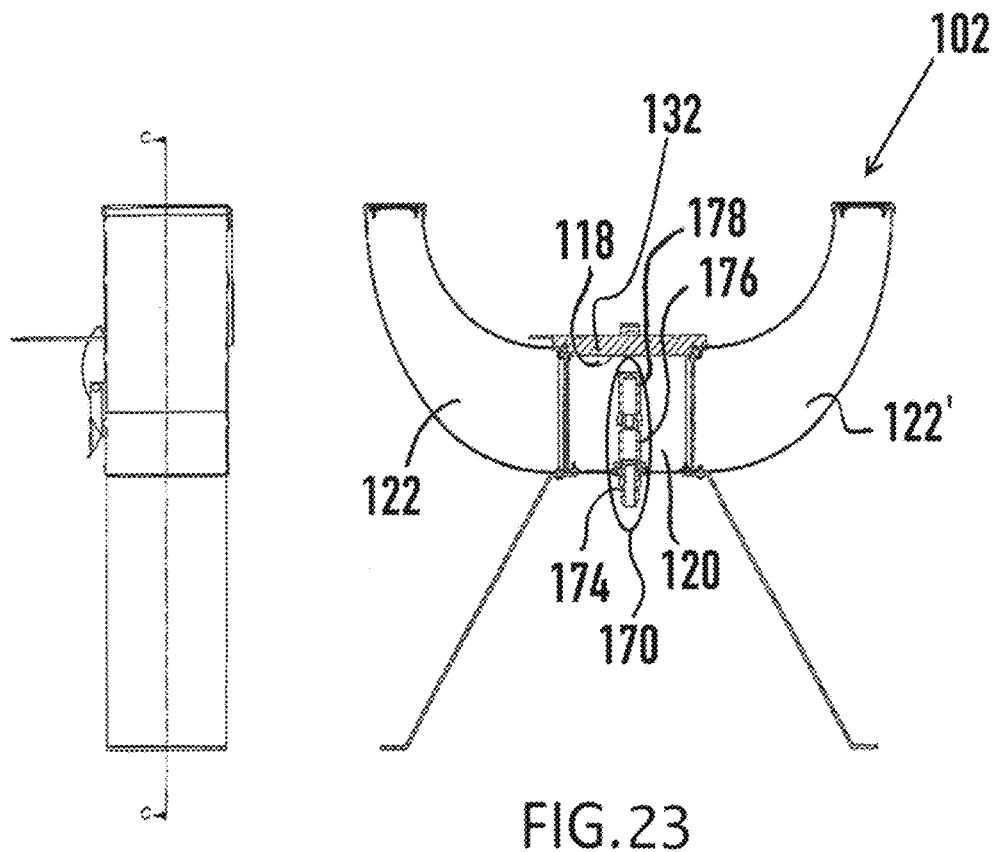
FIG. 22 is a side view of the instant freezer apparatus of FIG. 21.
FIG. 23 is a cross sectional view along the C-C axis of the instant freezer apparatus of FIG. 24.

Now referring to FIG. 23, the freezing chamber 120 once adapted for the use of a liquid carbon dioxide or any other appropriate freezing fluid, comprises at least one freezing fluid injector assembly 170, preferably located at a central location underneath the holder openings 160 (see FIG. 23). In such an exemplary embodiment, the injector assembly 170 comprises a lower connector element 174 operatively connected to at least one fluid source, a middle gas injector element 176 and upper adjustable diffusion portion 178. The middle injector element 176 is typically mounted to the lower portion of the freezing chamber 120. Such configuration typically allows the lower connector element 174 to be operatively secured to the middle injector element 176. The lower connector element 174 is generally attached, such as screwed, in the lower portion of the middle injector element 176. Likewise, the upper adjustable diffusion element 178 is mounted to the upper adjustable diffusion element 178 by attaching or screwing the lower portion of the diffusion element 178 on top of the upper portion of the injector element 176 (see FIGS. 46-49). Accordingly, the injector assembly 170 design aims at improving maintenance and repairs of the injector elements 174, 176, 178. In addition, the design of the injector assembly 170 allows an easy adjustment and mounting of the injector assembly via the use of screwing mechanisms. Understandably, though the preferred method uses filets as a way of mounting the injector elements 174, 176, 178 to one another and to the freezing chamber 120 lower surface 147, other securing mechanisms may be used.

Understandably, in yet another embodiment, the injector assembly 170 may comprise more than one lower connector element, each lower connector being connected to a different fluid source making possible, in such a configuration, to have multi fluid inputs.

Figure 25:
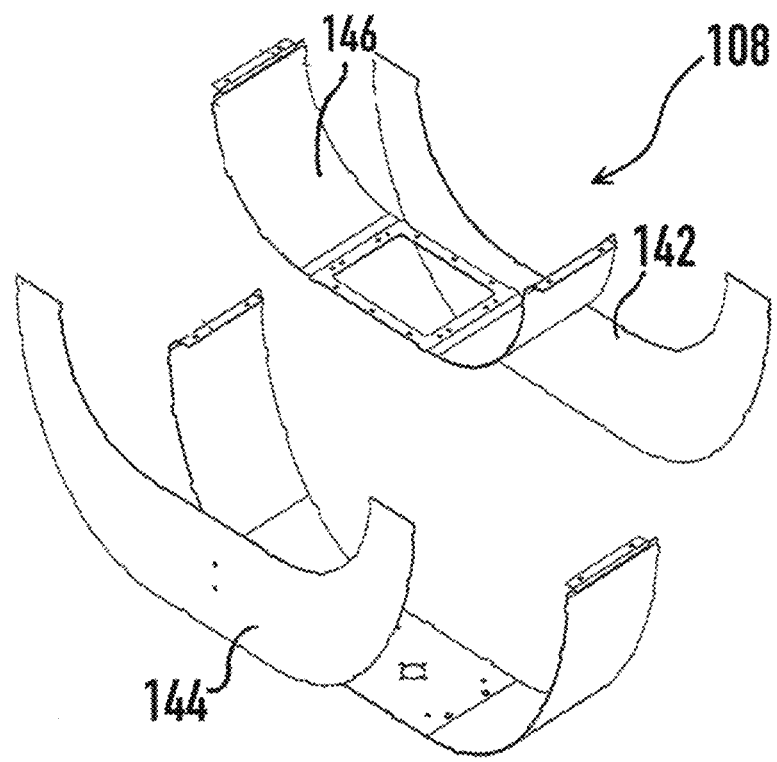
FIG. 25 is an exploded view of a main frame of the instant freezer apparatus of FIG. 21 having a freezing chamber and ventilating exits.
Figure 26:
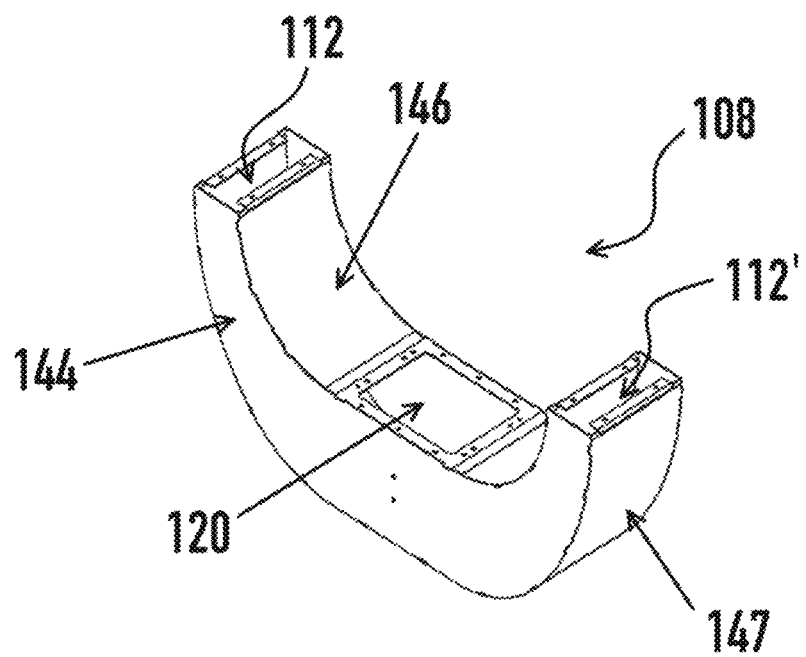
FIG. 26 is an assembled perspective view of the main frame of the instant freezer apparatus of FIG. 21 having the freezing chamber and ventilating exits.
Figure 27:
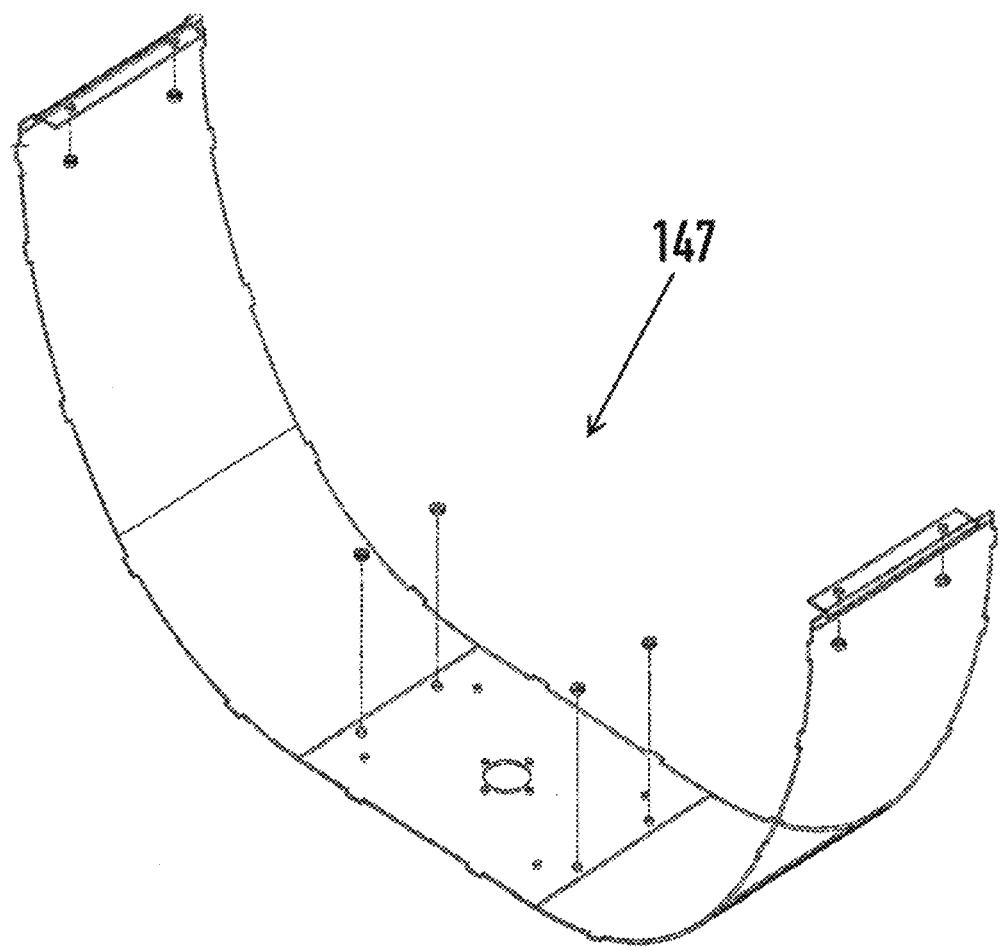
FIG. 27 is an exploded perspective view of a lower frame of the assembly of FIG. 26.
Figure 28:
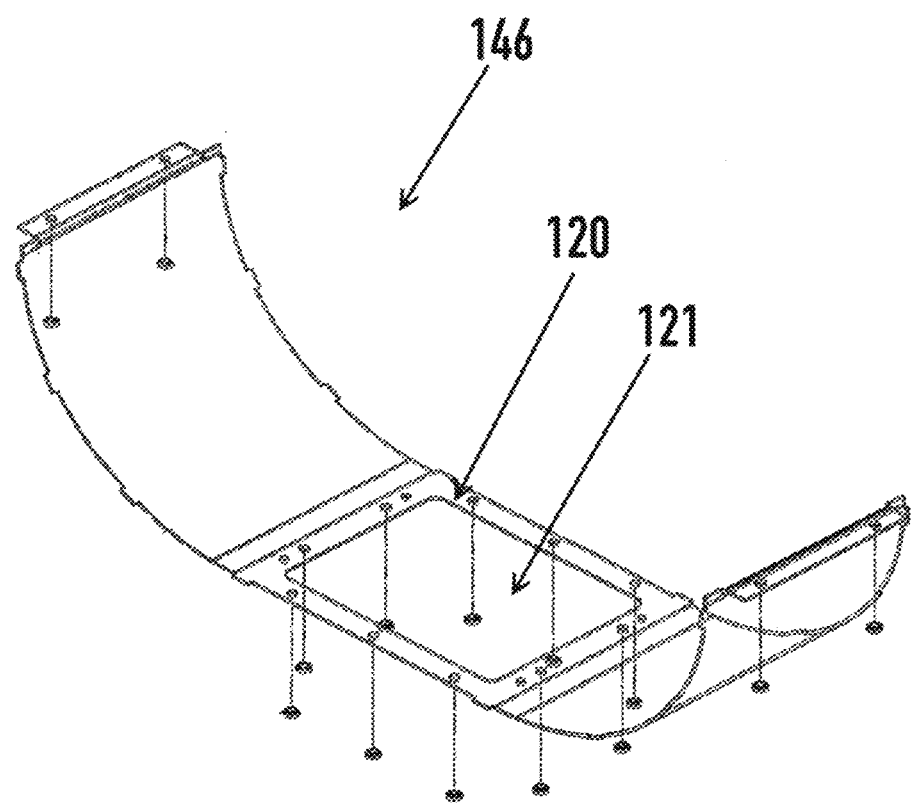
FIG. 28 is a perspective view of the upper frame of the assembly of FIG. 26.
Figure 30:
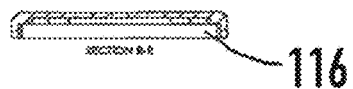
FIG. 30 is a cross sectional view along the B-B axis of the ventilation cap of FIG. 29.
Figure 32:
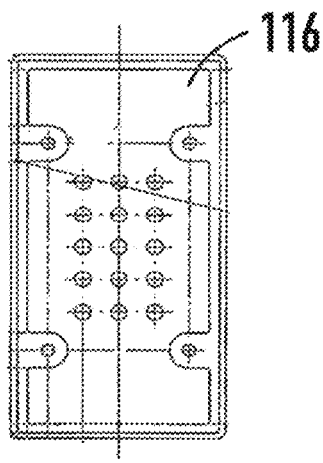
FIG. 32 is a bottom view of the ventilation cap of FIG. 29.
Figure 39:
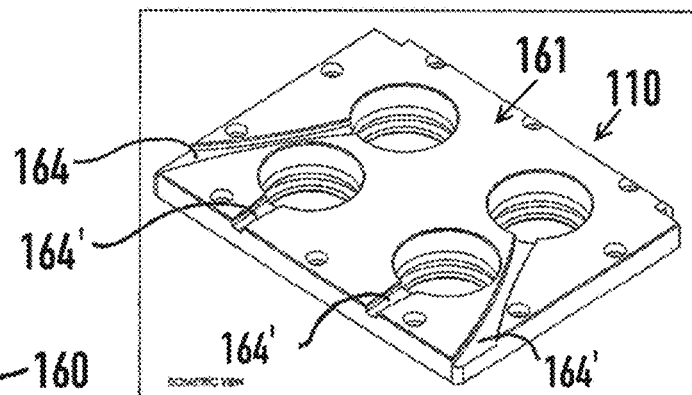
FIG. 39 is a perspective view of the cell holder of the instant freezer apparatus of FIG. 21.
Figure 34:
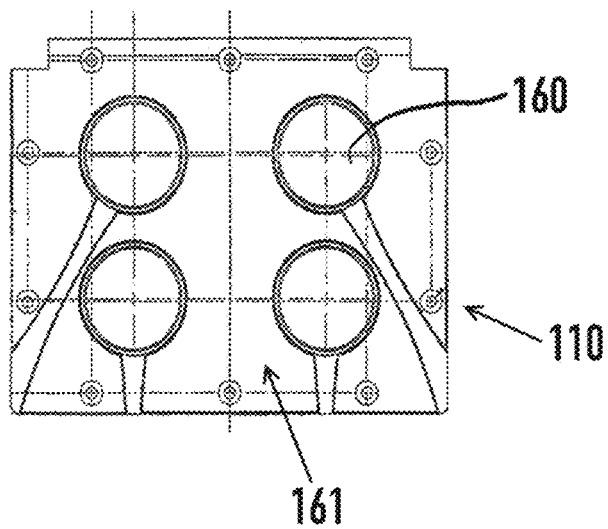
FIG. 34 is a top view of a cell holder of the instant freezer apparatus of FIG. 21.
Figure 35:
FIG. 35 is a side view of the cell holder of the instant freezer apparatus of FIG. 21.
Figure 36:
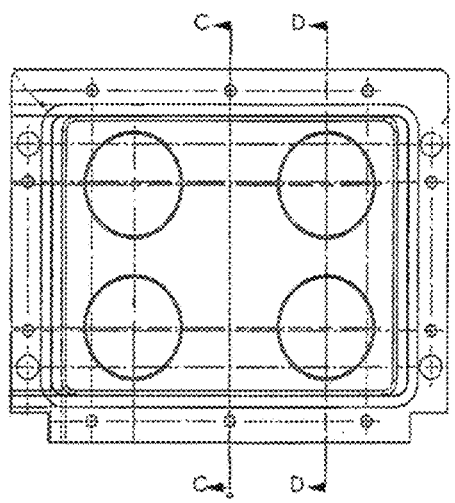
FIG. 36 is a bottom view of the cell holder of the instant freezer apparatus of FIG. 21.
Figures 37, 38:
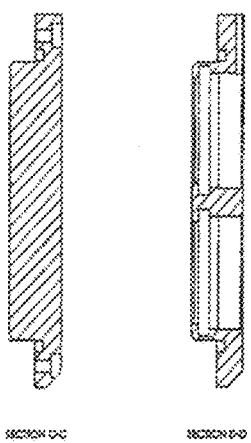
FIG. 37 is a cross sectional view along the C-C axis of the cell holder of FIG. 36.
FIG. 38 is a cross sectional view along the D-D axis of the cell holder of FIG. 36.

Referring now to FIGS. 24 and 25, in some embodiments, the instant freezing apparatus 102 comprises a freezing chamber 120 which comprises a top portion 146, side portions 142 and 144 and a bottom portion 147. In a typical embodiment, the different portions 146, 142, 144 and 147 are fixed together, such as welded to form a sealed chamber. Understandably, any other mean known in the art of having a sealed chamber may be used, such as having a moulded freezing chamber 120. Other parts, such as the support structure 172 may be attached to the apparatus 102 using any attachment means, such as fasteners.

Referring now to FIGS. 51 to 83, a third embodiment of an instant freezer apparatus 302 is shown. Now referring to FIG. 51, the instant freeze apparatus 302 generally comprises a main frame 108 and a removable freezing module 110, referred herein after as a cell holder (see FIGS. 77-83). The main frame 108 comprises a freezing chamber 120 fluidly connected to at least one ventilating exits 112. In the present preferred embodiment, the freezing chamber 120 is fluidly connected to at least two ventilating exits 112 and 112'. The main frame 108 may further comprise a support structure 172 for supporting the freezing chamber 120 at a desired height. One skilled in the art shall understand that any other means for holding the instant freeze apparatus 302 may be used.

The third embodiment of the instant freezer apparatus 302 is essentially characterized by a multi injecting assembly 350 comprising a plurality of injectors being symmetrically positioned, such as being coupled as quadruplets (FIGS. 51, 54 to 66). The third embodiment may further comprise a securing cover 136 (FIGS. 70-76). The securing cover 136 may comprise protrusions 348. Such security cover 136 generally aims at improving the level of security during the operation of the apparatus 302.

Figure 51:
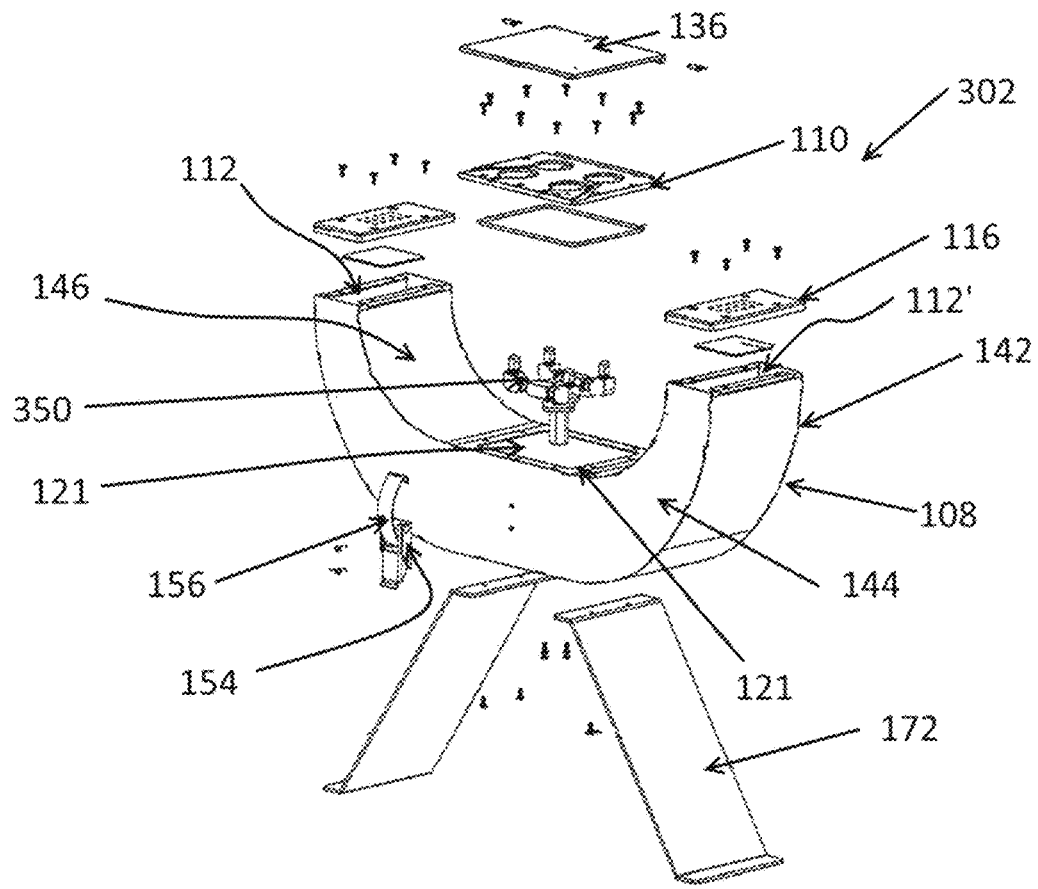
FIG. 51 is an exploded perspective view of another embodiment of an instant freezer apparatus according to the principles of the present invention.
Figures 52, 53:
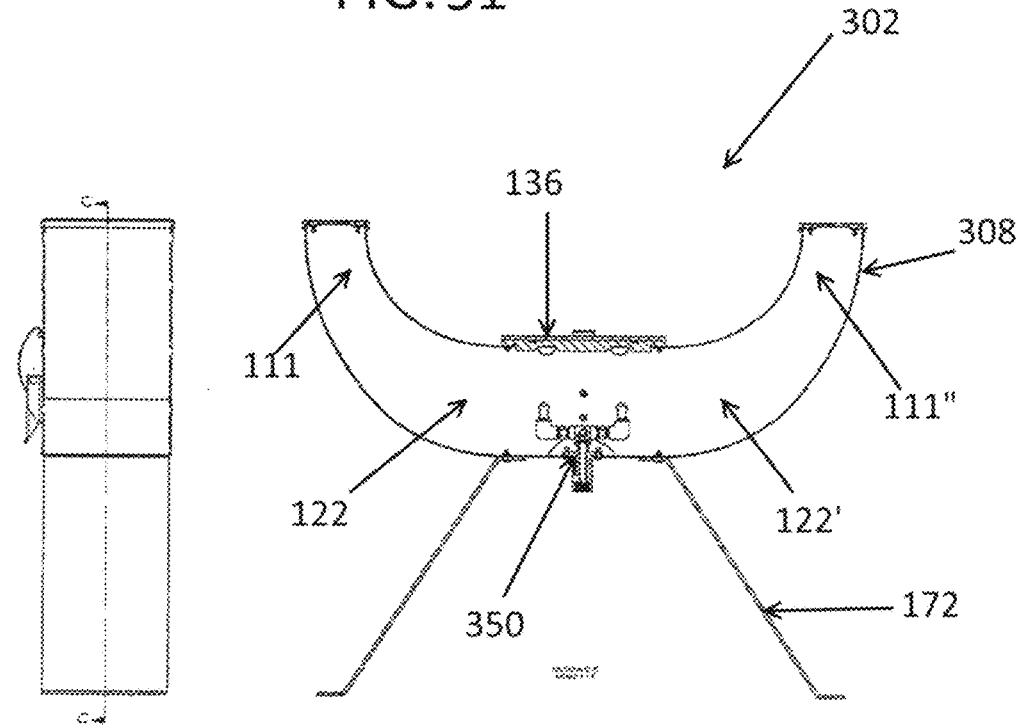
FIG. 52 is a side view of the instant freezer apparatus of FIG. 51.
FIG. 53 is a cross sectional view along axis C-C of the instant freezer of FIG. 52.
Figure 54:
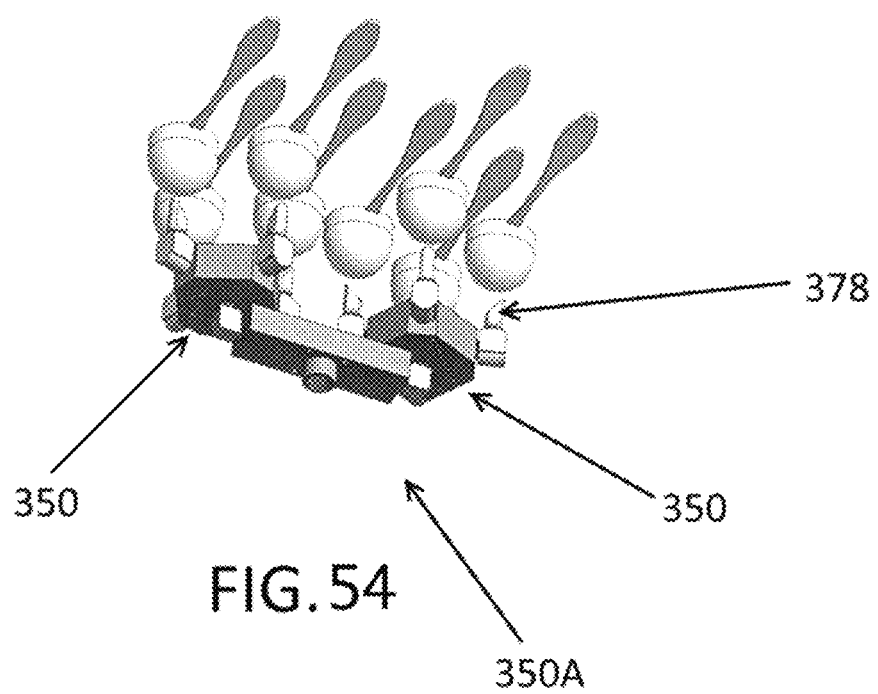
FIG. 54 is a perspective view of an injecting assembly and freezing cells of the instant freezer apparatus of FIG. 51.
Figure 55:
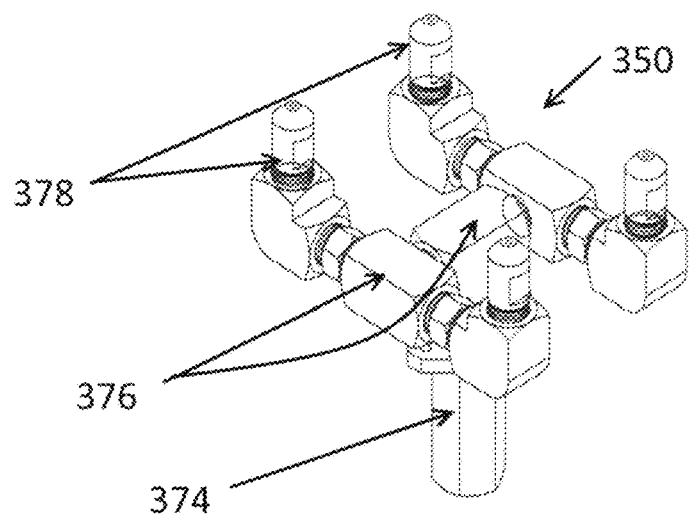
FIG. 55 is a perspective view of the injecting assembly of FIG. 54.
Figure 56:
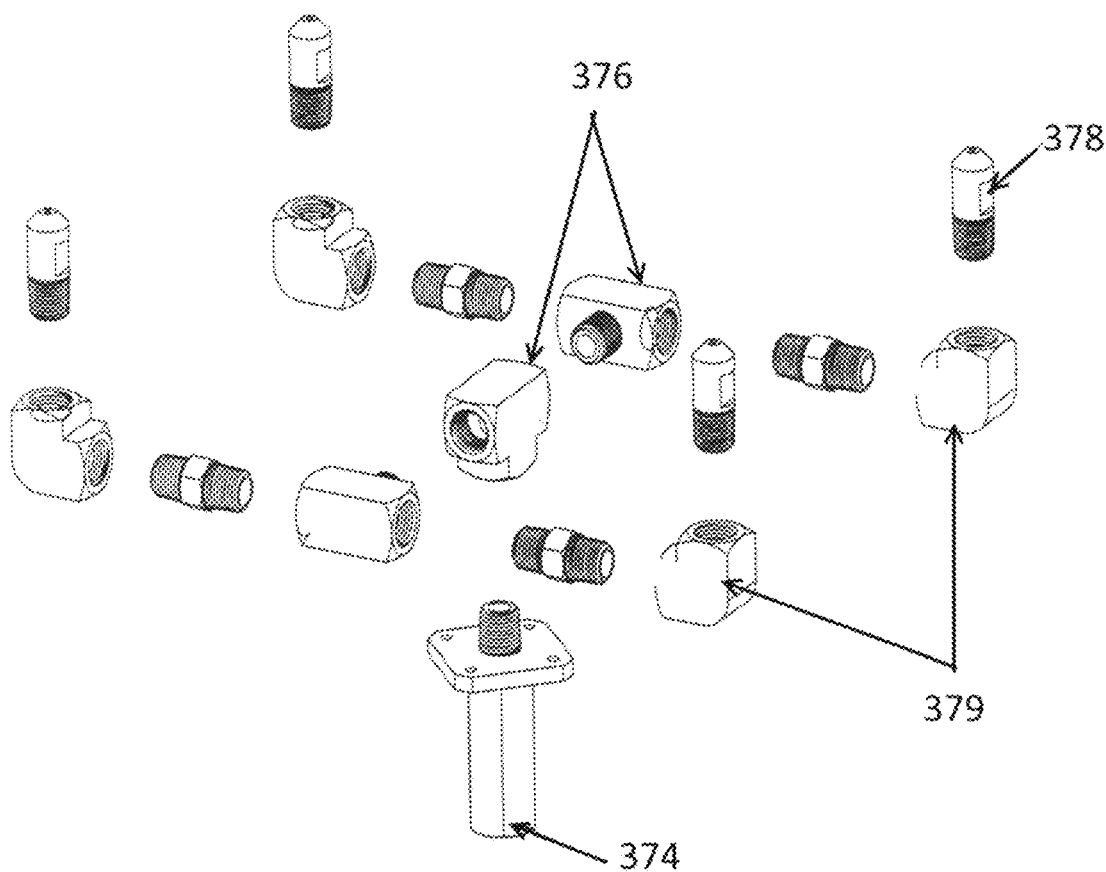
FIG. 56 is a perspective view of the injecting assembly of FIG. 54.
Figure 59:
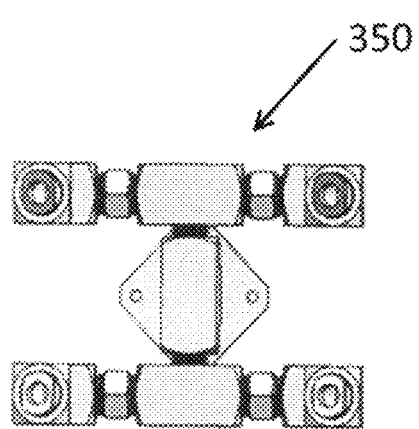
FIG. 59 is a bottom view of the injecting assembly of FIG. 56.
Figure 57:
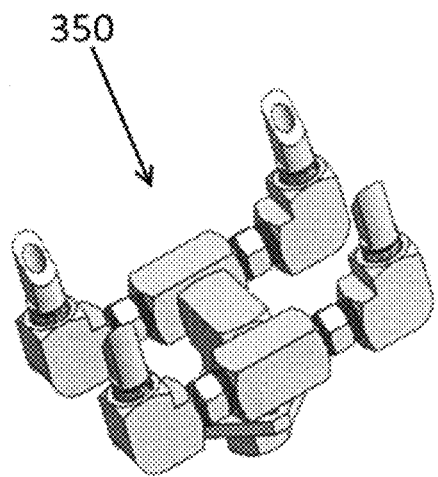
FIG. 57 is a perspective view of the injecting assembly of FIG. 54.
Figure 60:
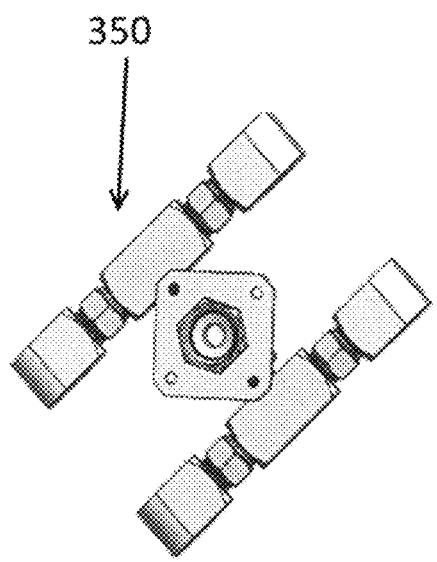
FIG. 60 is an exploded view of the injecting assembly of FIG. 55.
Figure 58:
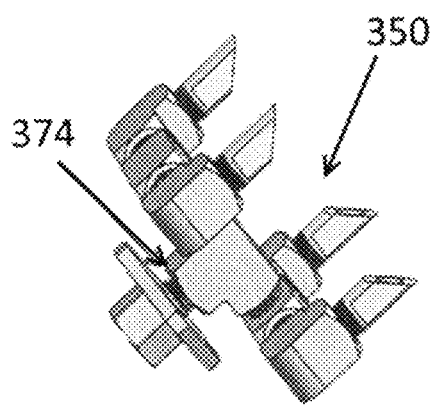
FIG. 58 is a top view of the injecting assembly of FIG. 56.
Figure 64:
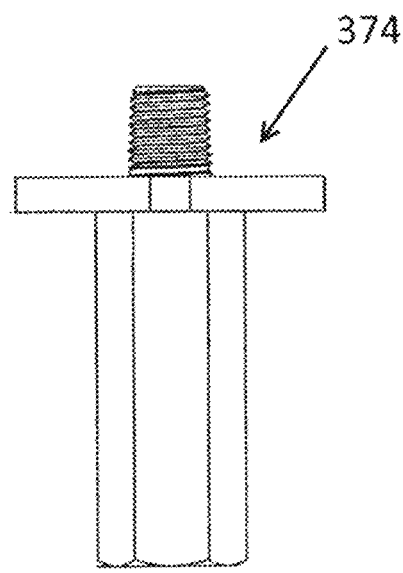
FIG. 64 is a front view of a middle injector of the injecting assembly of the instant freezer apparatus of FIG. 51.

Referring now to FIGS. 51 and 53, the main frame 108 is generally shaped as an elongated U or rectangular prism having the extremities 111, 111' of the prism upwardly bent. The main frame 108 comprises two side surfaces 142 and 144, an upper surface 146 and a lower surface 147. The upper surface 146 comprises an aperture 121 adapted to host the removable freezing module 110.

The main frame 108 further comprises ventilating exits or chimneys 112 and 112'. In such an embodiment, the ventilating exits 112 and 112' are an integral part of the freezing chamber 120. The freezing chamber 120 may then comprise a U-shaped prism. The ventilating exits 112, 112' are fluidly connected with the freezing chamber 120 in a way to optimise the freezing efficiency of the instant freezing apparatus. Understandably, in other embodiments, the ventilating exits 112 and 112' may distinct parts attached to the main frame 108 without departing from the scope of the present invention.

In the third embodiment, the ventilating exits 112 and 112' are connected with the freezing chamber in such a way to optimize the freezing fluid retention in the freezing chamber 120 while allowing superfluous gas to escape via the exits 112 and 112'. This gas isolation increases the duration for which the freezing chamber 120 maintains a low temperature while minimizing the required volume of the freezing fluid.

Figure 67:
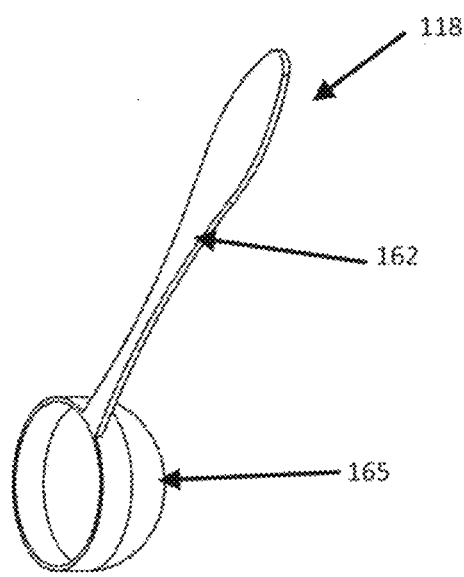
FIG. 67 is a perspective view of a freezing cell of the instant freezer apparatus of FIG. 51.
Figures 68, 69:
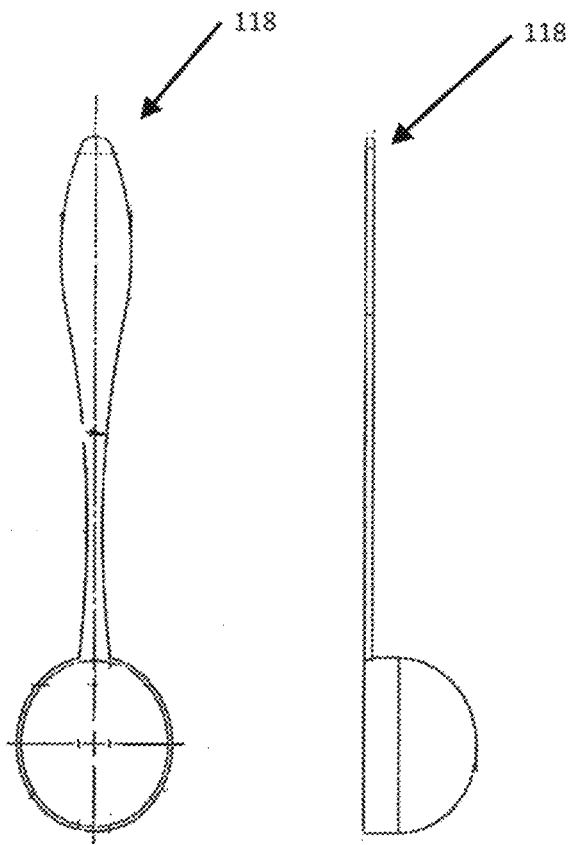
FIG. 68 is a top view of a freezing cell of the instant freezer apparatus of FIG. 51.
FIG. 69 is a side view of a freezing cell of the instant freezer apparatus of FIG. 51.
Figure 70:
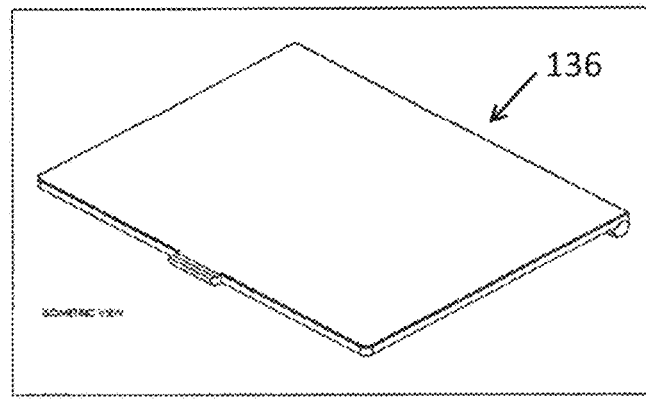
FIG. 70 is a perspective view of a holder cover of the instant freezer apparatus of FIG. 51.
Figure 72:
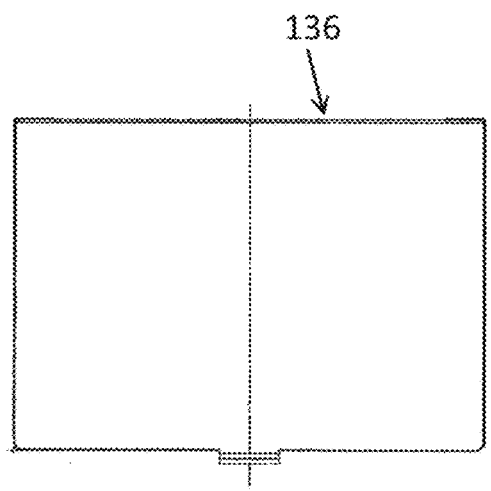
FIG. 72 is a top view of a holder cover of the instant freezer apparatus of FIG. 51.
Figure 71:
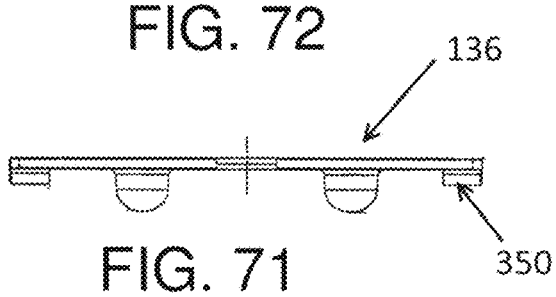
FIG. 71 is a front view of a holder cover of the instant freezer apparatus of FIG. 53.
Figure 76:
FIG. 76 is a close view of a securing element of the holder cover of FIG. 74.
Figure 73:
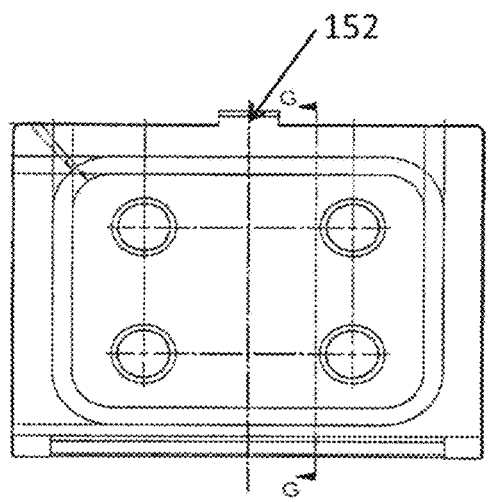
FIG. 73 is a bottom view of a holder cover of the instant freezer apparatus of FIG. 51.
Figures 74, 75:
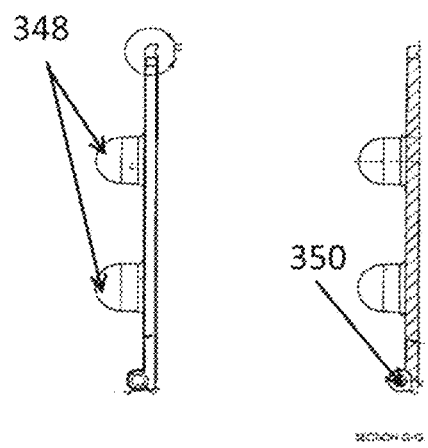
FIG. 74 is a side view of a holder cover of the instant freezer apparatus of FIG. 51.
FIG. 75 is a cross sectional view along G-G axis of the holder cover of FIG. 73.
Figure 79:
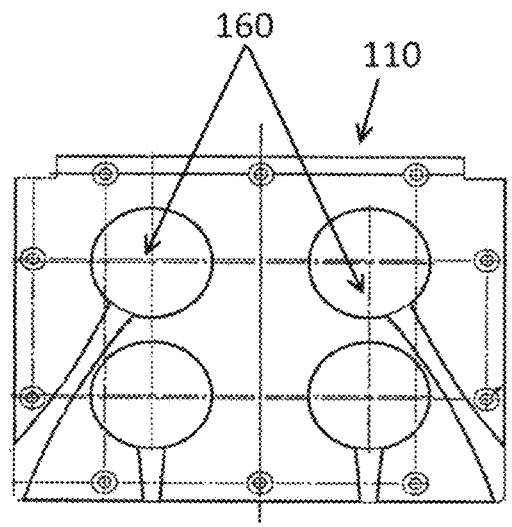
FIG. 79 is a top view of a cell holder of the instant freezer apparatus of FIG. 51.
Figure 77:
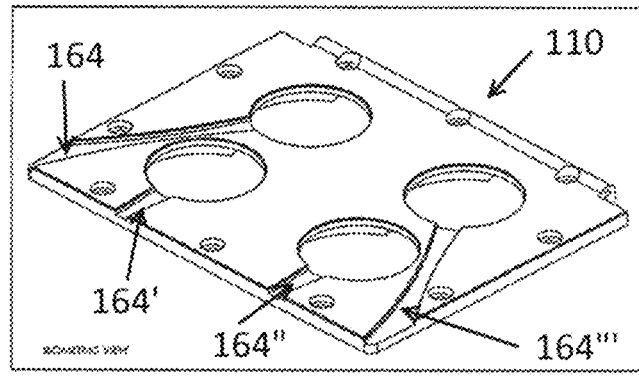
FIG. 77 is a perspective view of a cell holder of the instant freezer apparatus of FIG. 51.
Figure 78:
FIG. 78 is a front view of a cell holder of the instant freezer apparatus of FIG. 51.
Figure 83:
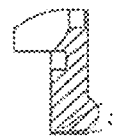
FIG. 83 is a close view of a securing element of the cell holder of FIG. 82.
Figure 80:
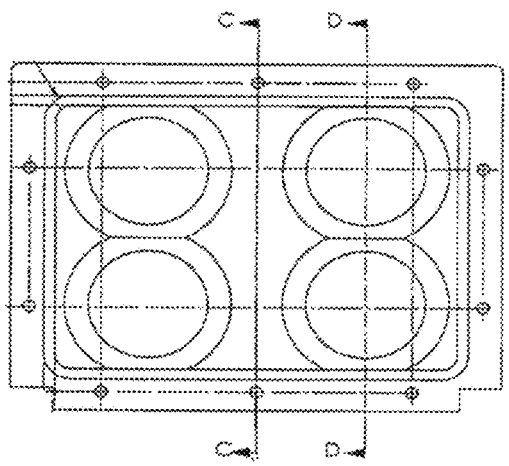
FIG. 80 is a bottom view of a cell holder of the instant freezer apparatus of FIG. 51.
Figures 81, 82:
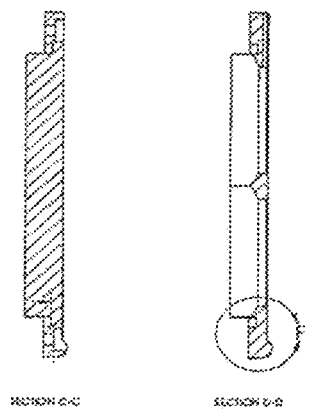
FIG. 81 is a cross sectional view along C-C axis of the cell holder of FIG. 80.
FIG. 82 is a cross sectional view along D-D axis of the cell holder of FIG. 80.

Still referring to FIG. 51, in the third preferred embodiment, the ventilating exits 112, 112' may further comprise ventilation openings 114 for channelling the exiting fluid. The ventilation openings 114 may be integrated in a ventilation cap 116. The size and number of openings 114 fluidly connecting the ventilation exits 112, 112' to the exterior generally depend, not only, on the size of the freezing chamber 120 but also on the volume of the freezing fluid normally required for cooling down freezing cells 118 (FIGS. 67 to 69). As such, in the present preferred embodiment, the openings 114 have very small areas thereby optimizing the freezing fluid retention in the freezing chamber 120. The openings 114 aim at filtering or isolating the freezing fluid within the freezing chamber 120. As the freezing fluid or a solid freezing fluid remains during a longer period within the ventilation cavity 122 or 122' (FIG. 53), the required volume of the freezing fluid may be minimized during the freezing process.

Understandably, the configuration of the openings 114 on the ventilating exit 112 may vary from one embodiment to the other. One skilled in the art shall understand that the openings 114 may be located on any other face of the freezing chamber 120, as long as the openings 114 ventilate the gases from the freezing chamber 120.

Understandably, once the instant freezer apparatus is adapted to be used with liquid carbon dioxide, the intersecting wall 106, the apertures 138 and the openings 114 may be configured to retain the solid carbon dioxide inside the freezing chamber 120. In fact, once injected to the freezing chamber 120, the liquid carbon dioxide transforms into kind of solid carbon dioxide or snow-like substance inside the freezing chamber 120. Thus, the form and the size of the intersecting wall 106, the apertures 138 and the openings 114 are adapted to prevent the snow resulting of the injection of liquid carbon dioxide from exiting the freezing chamber 120. The snow-like substance resulting of the injection of liquid carbon dioxide maintains the low temperature inside the freezing chamber 120.

Now referring to FIGS. 67-69, the instant freeze apparatus 302 comprises freezing cells 118 which are typically removable from the removable freezing module 110, referred herein to as a cell holder. The freezing cells 118 are preferably embodied as spoons. Each freezing cell comprises a handle 162 supporting at one end a receptacle 165 preferably shaped as a cylindrical or combination of hemispherical and cylindrical elements. The handle 162 is configured to ease the insertion and removal of the individual freezing cells 118 from the cell holder 110. The cell holder 110 (FIGS. 77-83) is typically embodied as a plate holder having holder openings 160 about the size of the freezing cells 118 and configured to receive said freezing cells 118. In yet another embodiment, the freezing cells may be shaped in other forms or geometries.

In a preferred embodiment, the receptacle 165 is made with thermally conductive material. As the freezing fluid or low temperature air contacts the receptacle 165 within the freezing chamber 120, the receptacle 165 thermally conducts the low temperature to the substance to be frozen within the receptacle 165. Such process allows the substance to be frozen to instantly freeze as the temperature of the receptacle 165 is maintained at a freezing temperature.

Referring further to FIGS. 77 to 82, the removable freezing module 110, referred herein to as a cell holder, is shown. The cell holder 110 comprises grooves 164, 164', 164'', 164''' adapted for receiving a portion or the entirety of the handle 162 of a freezing cell 118. As such, when in use, the freezing cell 118 is received in the holder opening 160 with a corresponding handle 162 received in the corresponding groove 164. Accordingly, the cell holder 110 is configured to be in closed portion, unhindered by the freezing cells 118 and their respective handles 162. In such a configuration, the cell holder 110 retains the freezing cells 118 in position during use of the instant freezing apparatus 302 despite the increased gas pressure generated from the freezing chamber 120.

In this embodiment, the removable freezing module 110 comprises four openings 160 split in two rows of 2 openings. Such openings 160 may have any shape which is compatible with the shape of the freezing cells. In the present embodiment, the openings 160 are typically shaped as open cylindrical or combination of hemispherical and cylindrical elements (see FIGS. 77 to 82) but could also shaped as any custom shape as required by the use.

Understandably, the volume of each freezing cell 118 generally matches the volume of the fluid or element to be frozen. As an example, a 40% volume/volume alcohol drink would typically be frozen in a half-ounce (15 ml) freezing cell 118.

Referring back to FIGS. 77 to 82, the cell holder 110 is preferably mounted on the open portion 121 of the freezing chamber 120 to mate, preferably to sealingly mate, with the main frame upper wall 146 and side walls 142, 144. The cell holder 110 may be covered using a holder cover 136. Referring to FIGS. 70 to 76, in a preferred embodiment, the holder cover 136 is pivotally connected to the cell holder 110 for securing the freezing cells 118 therein without being removable from the apparatus 302. Such cover 136 shall be made of material resisting to extreme cold temperatures and large temperature differences. In this third embodiment, the holder cover 136 is generally embodied as a plate having protrusions 348 and a pivot mechanism 150, such as hinges, attached to the cell holder 136. The protrusions 348 aim at facilitating the freezing process of fluids or food inside the freezing cells by reducing the central volume inside the freezing cells. Furthermore, the protrusions 348 are made of material having thermal conductivity properties, the protrusions 348 generally aims at freezing the portion of substance in contact with the said protrusions 348. It shall be understood that the protrusions 348 of made of thermally conductive material aims at freezing the central portion of the substance contained in the freezing cell as such portion of the substance is further from the thermally conductive freezing cell surface.

Now referring back to FIG. 51, the instant freezer apparatus may further comprise a latch mechanism 154 (FIG. 24) for securing the holder cover 136 to the apparatus 302 via the protrusion 152. In use, the latch element 156 of the latch mechanism 154 secures the closed holder cover 136 via the protrusion 152. Understandably, any other mean for securing the holder cover 336 to the apparatus 302 may be used.

Figure 66:
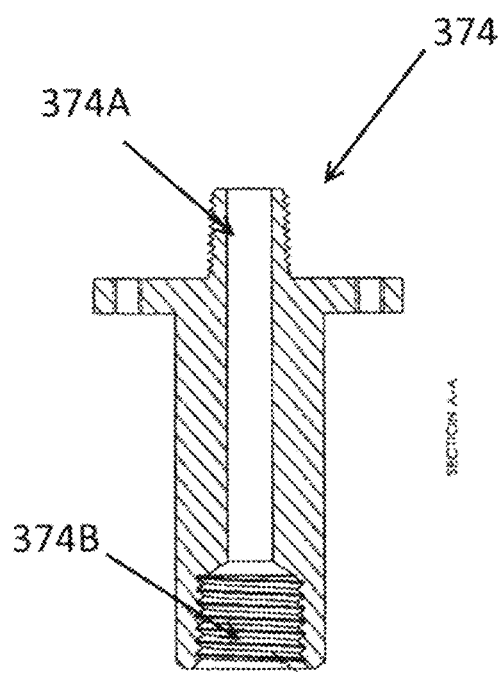
FIG. 66 is a cross sectional view along axis A-A of the middle injector of FIG. 65.
Figure 65:
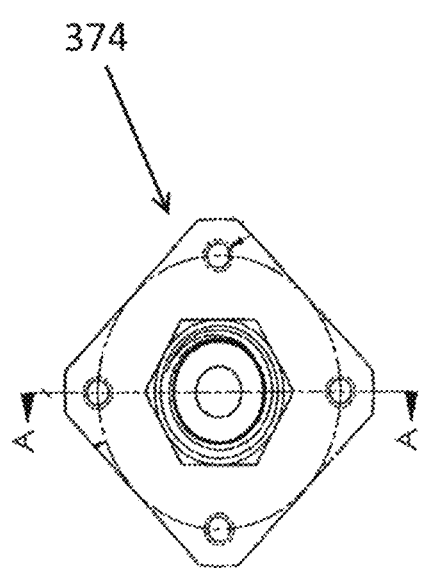
FIG. 65 is a top view of a middle injector of the injecting assembly of the instant freezer apparatus of FIG. 51.

According to this embodiment, for its part and as shown on FIGS. 53 to 68, the freezing chamber 120 once adapted for the use of a liquid carbon dioxide or any other appropriate freezing fluid, comprises at least one freezing fluid injecting assembly 350, preferably centrally located underneath the holder openings 160 (see FIG. 53). The injector assembly 350 according to this exemplary embodiment comprises a plurality of injectors coupled as quadruplet in a way that each injector is positioned directly below a holder opening 160. Thus, as seen in FIG. 66, each injecting assembly 350 comprises a lower central connector element 374 operatively connected to a freezing fluid source via a lower attach 374B, at least one middle injector element 376 and four upper adjustable gas diffusion portion 378. The lower central injector element 374 is mounted to the lower portion of the freezing chamber 120. At least one middle connector element 376 is operatively secured to the top portion 374A of the lower injector element 374. The upper adjustable diffusion element 378 is connected to the middle diffusion element 376 via connecting elements 379. Accordingly, the injector assembly 350 design allows easy maintenance and repairs of the injector elements 374, 376, 378 and 379. In addition, the design of the injector assembly 350 allows freezing at least 4 freezing cells. Understandably, as shown on FIG. 54, such a configuration of an injecting assembly 350A allows easy doubling of freezing cells by combining two injecting assembly 350.

Understandably, any other configuration of injectors may be used without departing from the principles of the present invention. In some embodiments, it has been observed that configuration where injectors are positioned with regard to one or more symmetry axis improves the efficiency of the apparatus 302.

Understandably, in yet another embodiment, the injector assembly 170 may comprise more than one lower connector element, each lower connector being connected to a different fluid source making possible, in such a configuration, to have multi fluid inputs.

Referring now to FIGS. 84 to 108, a fourth embodiment of an instant freezer apparatus 402 is illustrated. The instant freezing apparatus 402 generally comprises a main frame 108 and a removable freezing module 110A, referred herein after as a cell holder. The main frame 108 comprises a freezing chamber 120 fluidly connected to at least one ventilating exits 112. In the present preferred embodiment, the freezing chamber 120 is fluidly connected to at least two ventilating exits 112 and 112' (FIG. 88). The main frame 108 may further comprise a support structure 172 for supporting the freezing chamber 120 at a desired height. One skilled in the art shall understand that any other means for holding the instant freeze apparatus 402 may be used. The fourth embodiment of the instant freezer apparatus 402 is essentially characterized by a multi injecting assembly 450 comprising a plurality of injectors, preferably 8 injectors, coupled to a semicircular injecting base 451 or 451A (FIGS. 97 to 102, FIGS. 106 and 107). The fourth embodiment is further characterized by an optimized security lock 480 and a gas debit control system 490.

Figure 103:
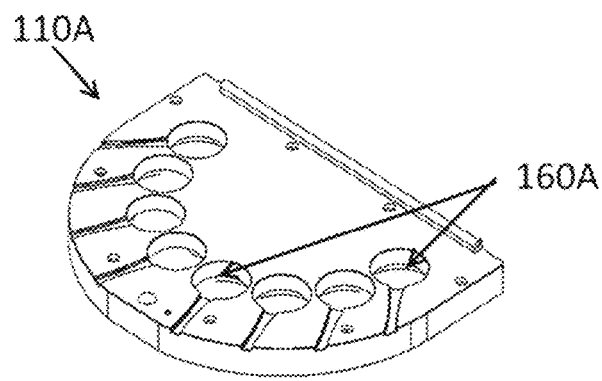
FIG. 103 is a perspective view of a cell holder of the instant freezer apparatus of FIG. 87.
Figure 106:
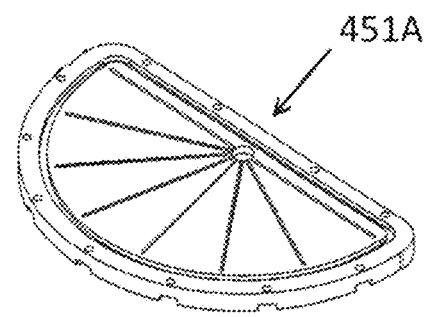
FIG. 106 is a perspective view of a second embodiment of an injecting base of the instant freezer apparatus of FIG. 87.

Referring now to FIGS. 84 and 85, the main frame 108 is shaped as an elongated U or rectangular prism having the extremities 111, 111' of the prism upwardly bent. The main frame 108 comprises two side surfaces 142 and 144, an upper surface 146 and a lower surface 147. The upper surface 146 comprises an aperture 121 adapted to host the removable freezing module 110A (FIG. 103).

As shown on FIG. 88, the main frame 108 further comprises ventilating exits or chimneys 112 and 112' (FIG. 88). The ventilating exits are an integral part of the freezing chamber 120 as such, the freezing chamber 120 comprises a U-shaped prism. The ventilating exits 112, 112' are fluidly connected with the freezing chamber 120 in a way to optimise the freezing efficiency of the instant freezing apparatus.

In the fourth preferred embodiment, the ventilating exits 112 and 112' are connected to the freezing module in such a way to optimize the freezing fluid retention in the freezing chamber 120 while allowing superfluous gas to escape via the exits 112 and 112'. This gas isolation increases the duration for which the freezing chamber 120 maintains a low temperature while minimizing the volume of the freezing fluid required.

Still referring to FIGS. 84 and 88, the ventilating exits 112, 112' may further comprise ventilation openings 114 for channelling the exiting fluid. The ventilation openings 114 may be integrated in a ventilation cap 116. The size and number of openings 114 fluidly connecting the ventilation exits 112, 112' to the exterior generally depend on the size of the freezing chamber 120. The size and number of opening may further depend on the volume of the freezing fluid normally required for cooling down freezing cells 118 (FIG. 67-69). As such, in the present embodiment, the openings 114 have small areas thereby optimizing the gas retention in the freezing chamber 120. Understandably, the configuration of the openings 114 on the ventilating exit 112 may vary from one embodiment to the other. One skilled in the art shall understand that the openings 114 may be located on any other face of the freezing chamber 120, as long as the openings 114 ventilate the gases from the freezing chamber 120.

Understandably, once the instant freezer apparatus is adapted to be used with liquid carbon dioxide, the intersecting wall 106, the apertures 138 and the openings 114 may be configured to retain the solid carbon dioxide inside the freezing chamber 120. In fact, once injected to the freezing chamber 120, the liquid carbon dioxide transforms into kind of solid carbon dioxide or snow-like substance inside the freezing chamber 120. Thus, the form and the size of the intersecting wall 106, the apertures 138 and the openings 114 are adapted to prevent the snow resulting of the injection of liquid carbon dioxide from exiting the freezing chamber 120. The snow-like substance resulting of the injection of liquid carbon dioxide maintains the low temperature inside the freezing chamber 120.

Now referring to FIG. 89, the instant freeze apparatus 402 comprises freezing cells 118 which are typically removable from the removable freezing module 110A, referred herein to as a cell holder. The freezing cells 118 are embodied as spoons (FIG. 67-69). Each freezing cell comprises a handle 162 supporting at one end a receptacle 165 shaped preferably as a cylindrical or combination of hemispherical and cylindrical elements. The handle 162 is configured to ease the insertion and removal of the individual freezing cells 118 from the cell holder 110. The cell holder 110A, as shown by FIG. 103, is typically embodied as a plate holder having holder openings 160A about the size of the freezing cells 118 and configured to receive said freezing cells 118. In yet another embodiment, the freezing cells 118 may be shaped in other forms or geometries.

Still referring to FIG. 89, the removable module 110A, referred herein to as a cell holder, is shown. The cell holder 110A comprises grooves or recesses adapted for receiving a portion or the entirety of the handle 162 of a freezing cell 118. As such, when in use, the freezing cell 118 is received in the holder opening with a corresponding handle 162 received in the corresponding groove. Accordingly, the holder cover 110A is configured to be in closed portion, unhindered by the freezing cells 118 and their respective handles 162. In such a configuration, the cell holder 110A retains the freezing cells 118 in position during use of the instant freezing apparatus 402 despite the increased gas pressure generated from the freezing chamber 120.

In such an embodiment, referring to FIG. 103, the removable module 110A comprises openings 160A distributed in a circular way over the circumference the removable module 110A. Such openings may have a wide variety of shapes. In the present embodiment, the openings 160A are typically shaped as open cylindrical or combination of hemispherical and cylindrical elements but could also shaped as any custom shape as required by the use. The freezing cells 118 may have any shape adapted to retain the substance to be frozen with the freezing cells 118 during the freezing process. In a preferred embodiment, the freezing cells 118 are shaped as spoon, having a handle and a rounded receptacle.

Understandably, the volume of each freezing cell 118 generally matches the volume of the fluid or element to be frozen. As an example, a 40% volume/volume alcohol drink would typically be frozen in a half-ounce (15 ml) freezing cell 118.

Referring back to FIGS. 84 and 106, the cell holder 110A is preferably mounted on the open portion of the freezing chamber 120 to, preferably, sealingly mate with the main frame upper wall 146 and side walls 142, 144. The cell holder 110A may be covered using a holder cover 136A or 136B FIG. 88, FIG. 104). The holder cover 136A or 136B is pivotally connected to the cell holder 110A for securing the freezing cells 118 therein without being removable from the apparatus 402. Such cover shall be made of material resisting to extremely cold temperatures and large temperature differences.

Figures 91, 92:
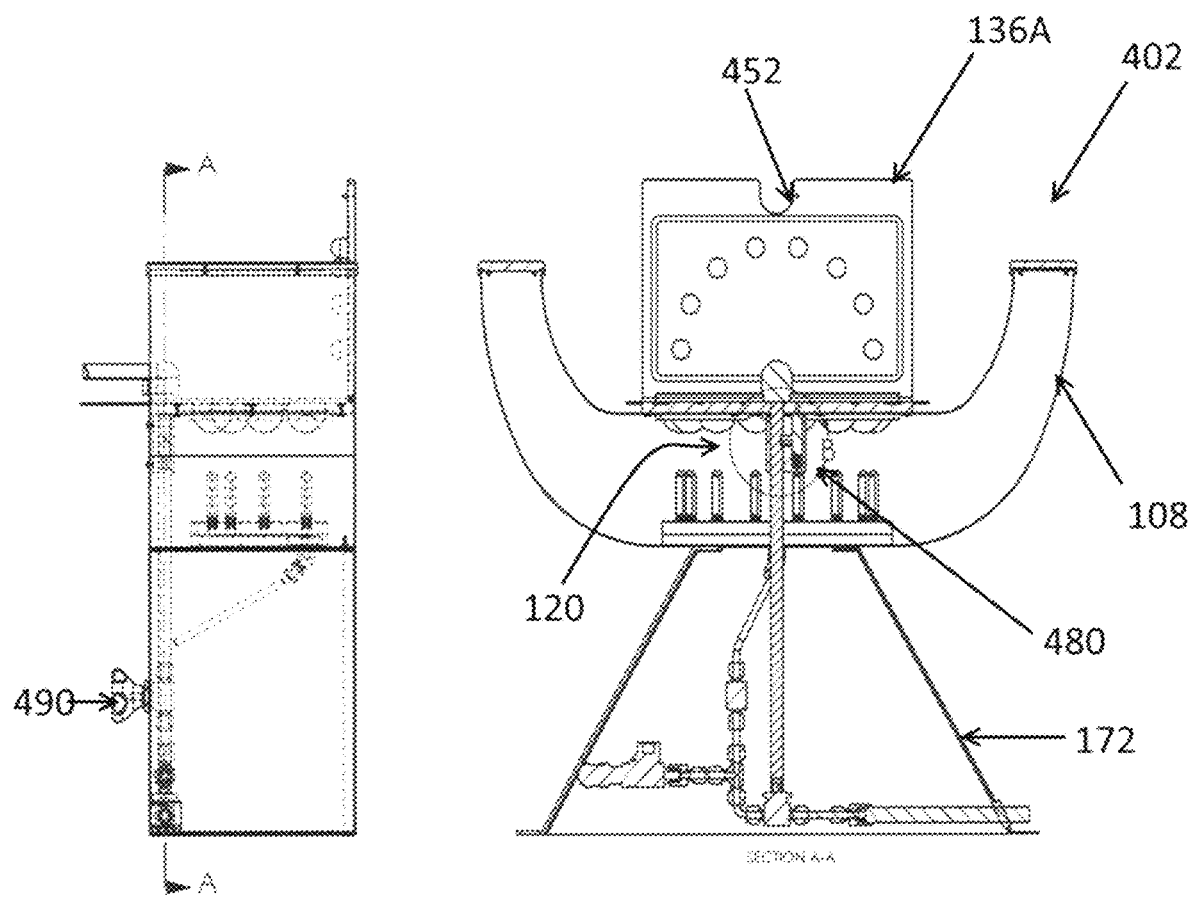
FIG. 91 is a front view of the instant freezer apparatus of FIG. 87 showing a security lock.
FIG. 92 is a side view of the instant freezer apparatus of FIG. 91 showing the security lock and the inner components of the instant freezer apparatus.
Figure 94:
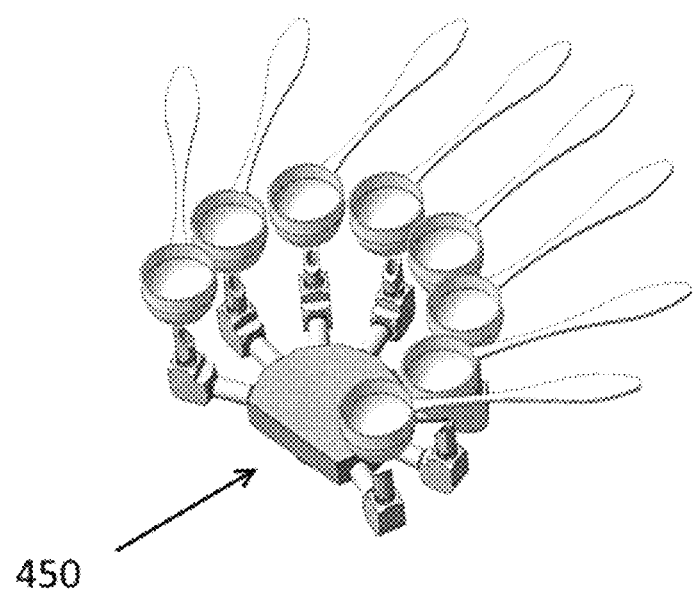
FIG. 94 is a perspective view of an injecting assembly and freezing cells of the instant freezer apparatus of FIG. 84.
Figure 96:
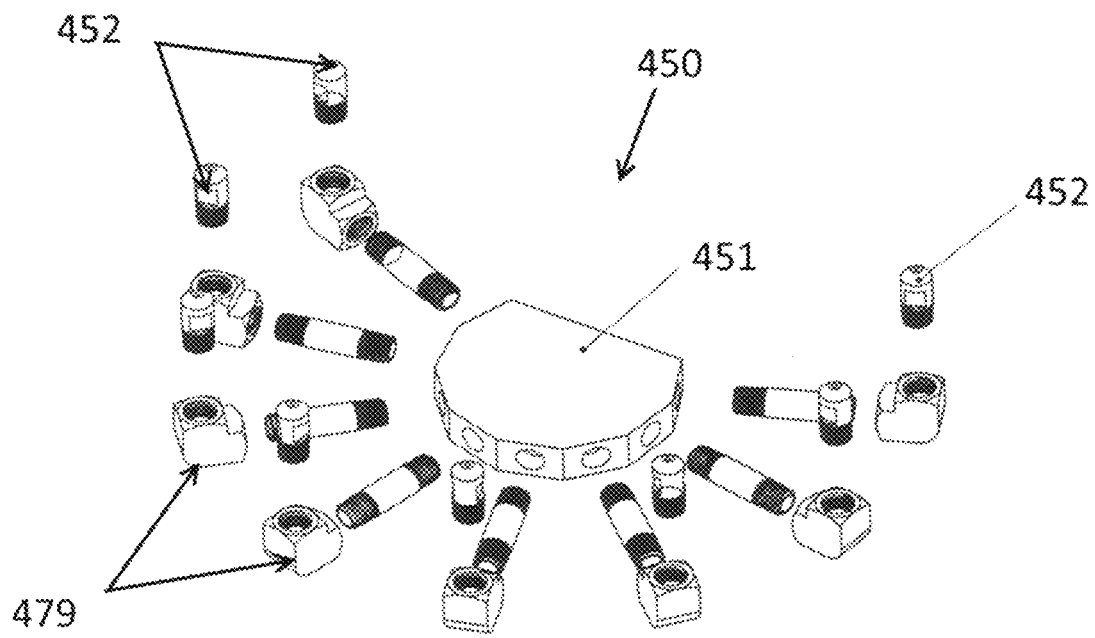
FIG. 96 is an exploded view of the injecting assembly of FIG. 95.
Figure 95:
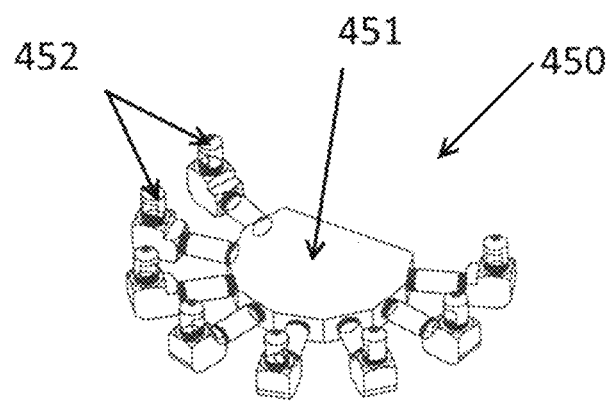
FIG. 95 is a perspective view of the injecting assembly of FIG. 94.
Figure 98:
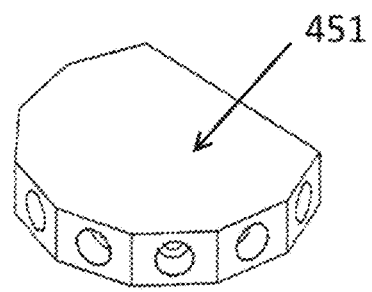
FIG. 98 is a top angled view of the injecting base of FIG. 97.
Figure 101:
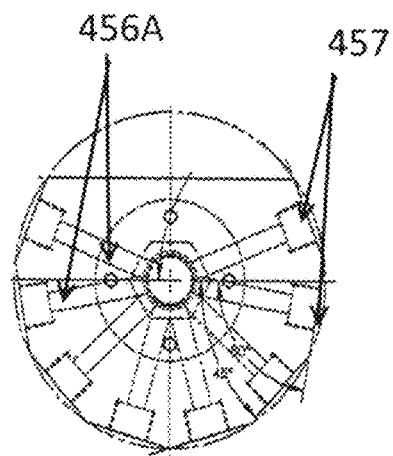
FIG. 101 is a top view of the injecting base of FIG. 97.
Figures 97, 102:
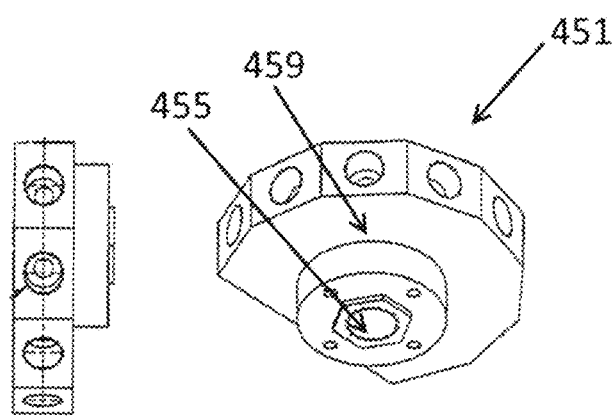
FIG. 97 is a perspective view of an injecting base of the injecting assembly of FIG. 96.
FIG. 102 is a side view of the injecting base of FIG. 97.
Figure 99:
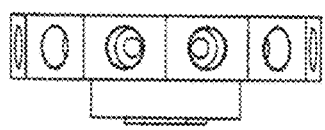
FIG. 99 is a front view of the injecting base of FIG. 97.
Figure 100:
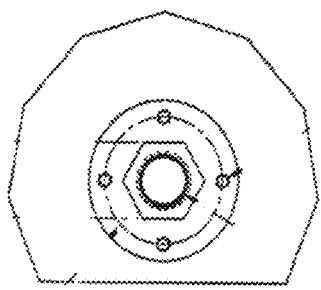
FIG. 100 is a bottom view of the injecting base of FIG. 97.
Figure 104:
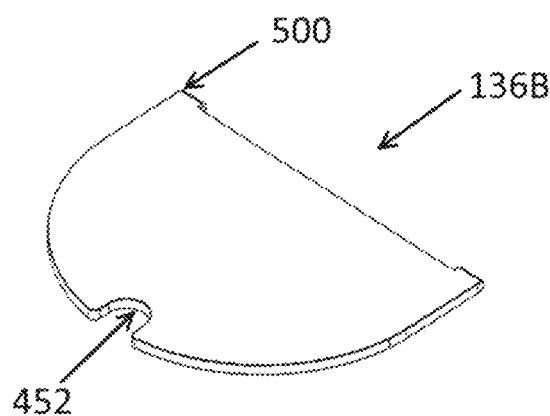
FIG. 104 is a perspective view of a second embodiment of a holder cover of the instant freezer apparatus of FIG. 87.
Figure 107:
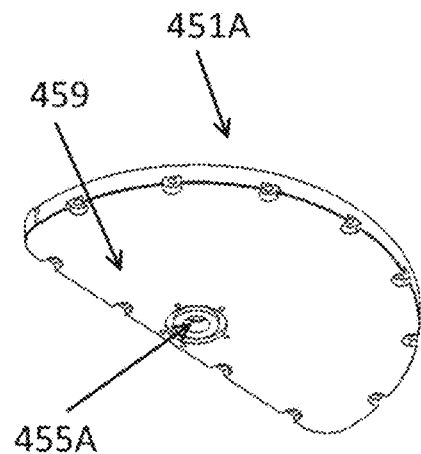
FIG. 107 is a bottom-angled view of the second embodiment of the injecting base of FIG. 106.
Figure 105:
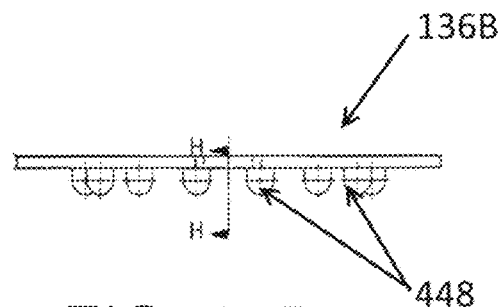
FIG. 105 is a front view of the second embodiment of the holder cover of FIG. 104.
Figure 108:
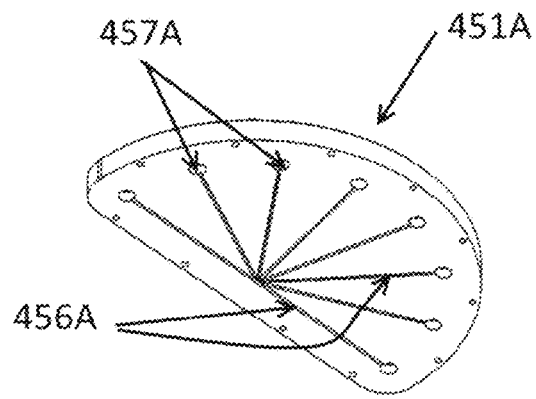
FIG. 108 is a top angled view of the second embodiment of the injecting base of FIG. 106.

The holder cover 136A or 136B, as illustrated by FIGS. 91 and 104, is generally embodied as a plate comprising protrusions 448 and a pivot mechanism 500, such as hinges, attached to the cell holder 110A. The protrusions 448 aim at facilitating the freezing process of fluids or food inside the freezing cells by reducing the central volume inside the freezing cells. Furthermore, the protrusions 448 are made of material having good thermal conductivity properties, the protrusions 448 generally aim at facilitating the freezing of the central portion of the substance to be frozen as the central portion is generally hard to be frozen.

The protrusions 448 are generally distributed over the surface of the cover 136A or 136B in the same configuration as the openings of the removable module 110A. The cover may further comprise an opening 452 on the side opposite to the pivot mechanism 450 to ease securing the holder cover 136A or 136B to the cell holder 110A when the freezing cells 118 are inserted thereto. The opening 452 may be adapted to receive a security handle 460 located on a side of the main frame and controlled by the user to open and close the apparatus.

Understandably, in other embodiments, the instant freezing device 402 may not comprise a cover without departing from the principles of the present invention.

According to this embodiment, for its part and as shown on FIGS. 94 to 102, the freezing chamber 120 adapted for use with carbon dioxide or any other appropriate freezing fluid, comprises at least freezing fluid injecting assembly 450, preferably centrally located underneath the holder openings 160A (see FIG. 91). The injector assembly 450 according to this exemplary embodiment comprises a plurality of injectors coupled to a semicircular injecting base 451 or 451A (FIGS. 106-108) in a way that each injector is positioned directly below a holder opening 160A of the cell holder 110A. Thus, each injecting assembly 450 comprises a lower central connector element or injecting base 451 or 451A operatively connected to a fluid source by the mean of a central portion 455 or 455A located on the bottom surface 459 or 459A of the injecting base. The injecting assembly further comprises 8 injectors 452. The injectors 452 are connected to the injecting base 451 via connecting elements 479 through opening 457 or 457A. The base is further comprising a plurality of conduits 456 or 456A allowing the circulation of fluids from the fluid source to the injectors 452. Accordingly, the design of the injector assembly 450 allows the freezing of 8 freezing cells.

Understandably, any other configuration of assembling the injectors 452 could be used without departing from the principles of the present invention. It has been observed that better performances are obtained by using a configuration having symmetrically positioned injectors 452.

Figure 90:
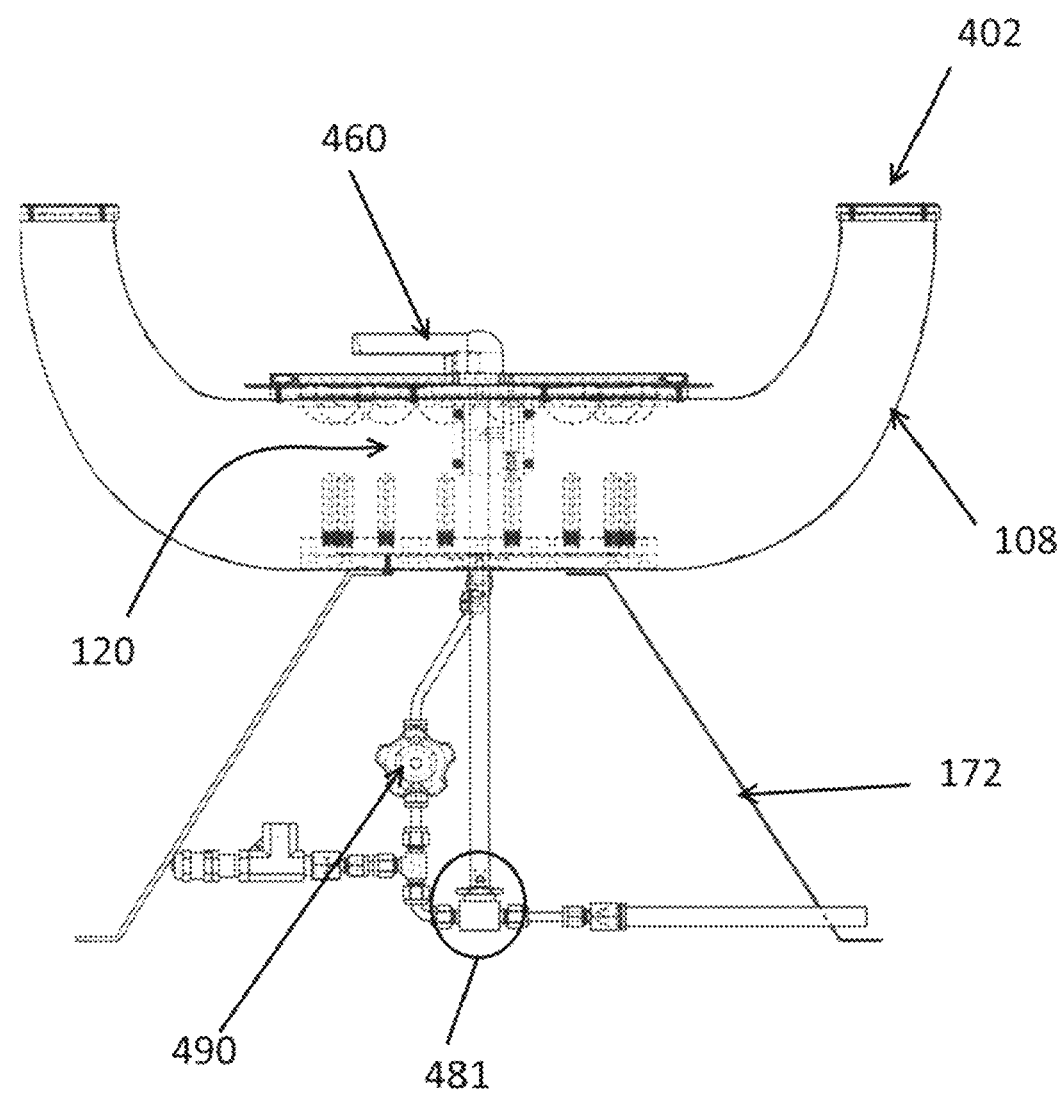
FIG. 90 is a front view of the instant freezer apparatus of FIG. 84 showing the inner components of the instant freezer apparatus.
Figure 93:
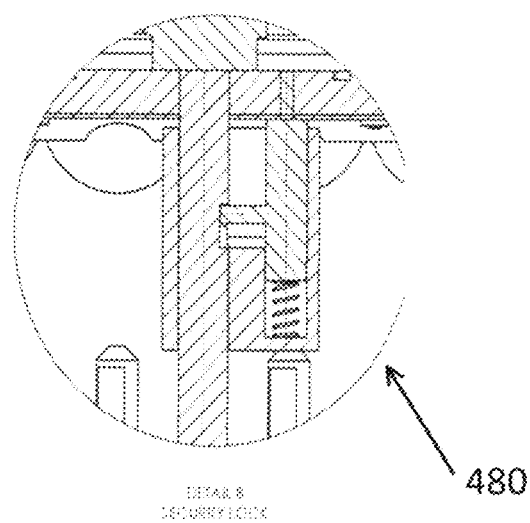
FIG. 93 is a closed view the security lock of the instant freezer apparatus of FIG. 91.

Referring now to FIG. 90, the security handle 460 may be attached to a bottom portion 481 of a security lock 480 integrated inside the main frame 108 between the two sides of the support structure 472. Such a security lock, as illustrated in FIGS. 90 and 93, aims at preventing any undesirable opening of the instant freezer apparatus. Furthermore, once a user opens the instant freezer apparatus by positioning the security handle 460 on its unlock position, the fluid source is closed and the injector assembly 450 is deactivated. In a preferred embodiment, the rotation of the handle 460 triggers the closing or opening of a valve connected to the freezing fluid tank.

In such an embodiment, the freezing fluid level may be manually controlled. To manually control the freezing fluid level, a user typically opens a debit control system 490 of a freezing injecting system to a degree allowing the temperature of the instant freezer apparatus to reach the desired coldness. When extensive use of the instant freeze apparatus 402 is required, a user may partially open the debit control system 490 of the injecting system to ensure the proper continuous flow of the freezing fluid to the freezing chamber 120. When light use of the device is required, the user may open the debit control 490 of the freezing injecting system until the desired temperature in the freezing chamber 120 is reached and close the debit control system 490 until further the temperature requires to be lowered.

In a preferred embodiment, the debit control system 490 is a valve.

In another embodiment, the temperature level of the instant freezer apparatus may be automatically controlled. In such an embodiment, the level of the freezing fluid may be controlled via a sensor, such as a mechanic or an electronic sensor, thereby allowing the apparatus to automatically and continuously refill the freezing fluid to the set level. In this embodiment, the instant freezer apparatus comprises a switch allowing turning on or turning off the automatic control of the temperature level. Such switch may be turned on or off depending on required usage.

In another embodiment using carbon dioxide, the apparatus may comprise a mean to manually control the input of cooling fluid. The mean may be embodied as a manual activation of each injector or group of injectors.

In a further embodiment, the apparatus may comprise a controller, such as a mechanical or electronic control, and a monitoring device, wherein the controller automatically actuates the one or more injector. In such embodiment, the controller may vary the actuation of the injectors depending on the desired use of the apparatus or on the desired number of freezing cells to be frozen.

In an embodiment using liquid nitrogen or liquid carbon dioxide as cooling fluid, the preferred material used to build the main frame or the freezing chamber must resist to extremely cold temperatures and large and instant temperature changes. In preferred embodiment, the freezing chamber is made of aluminium, stainless steel or composite material. The freezing cells are generally made of material having thermal conductive properties, such as but not limited to stainless steel (for comestible substance to be frozen). The injection system is typically made of material resisting to high pressures and to important temperature variation, such as copper or stainless steel.

According to another embodiment, the instant freezing apparatus may comprise oversized freezing modules for instantly freezing biological matter such as organs. The harvesting of organs from clinically dead people must be achieved quickly after the death of the person in order to transplanting to a living human being. In addition to the actual removing of the organ, such organ needs to be frozen as soon as possible for transport and for limiting damages to the organ. Accordingly, the instant freezing apparatus may provide useful assistance in freezing organs immediately following removal from the body. The instant freezing apparatus would speed up the freezing process thereby potentially increasing the odds of having a healthy organ for transplant. Understandably, such a freezing apparatus may be used to freeze any substance in a short lapse of time without departing from the present invention.

According to one embodiment, the instant freezing apparatus may comprise oversized freezing cavities for instantly freezing food. Such an embodiment could be used to instantly freeze food such as but not limited to fishes, meat or poultry for transportation. Complete meals may as well be frozen using an embodiment according to the present invention.

Referring now to FIGS. 90 and 91, a method of using an instant freezer apparatus is illustrated. The method comprises choosing the adequate injecting assembly depending on the number of fluids to be frozen and installing the injecting assembly on a lower surface of a main frame of a freezer apparatus. The method further comprises choosing a cell holder compatible with the injecting assembly and choosing a cover compatible with the cell holder. The method may further comprise pivotally assembling the cover to the cell holder using fasteners. Once the cover is correctly attached to the cell holder, the cell holder is positioned in an opening located on the top surface of the main frame and aligned with the freezing module. The method further comprises positioning the freezing cells inside openings of the cell holder configured to securely support the freezing cells. The user may then introduce the fluids inside the freezing cells and secure the cover to the main frame by the mean of one security locking system. Once the system is secured, the user may open the debit controlling system in a way to adjust the debit of the freezing fluid to maintain the desired temperature inside the freezing module. Finally, the user may take out the freezing cells once the freezing process is done and serve the frozen fluids.

The method may further comprise the step of closing the debit control system in case of a leaking.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. An apparatus for freezing a substance using a freezing fluid, the apparatus comprising:
   a) a freezing chamber;
   b) at least one removable freezing cell comprising:
      i) a first surface adapted to receive and hold the substance to be frozen;
      ii) a second surface opposite to the first surface adapted to be in fluid communication with the freezing chamber;
      iii) a handle;
   c) a freezing module adapted to receive the at least one removable freezing cell; and
   d) a freezing fluid injection system, the freezing fluid injection system being adapted to inject the freezing fluid in the freezing chamber toward the second surface of the at least one freezing cell.

2. The apparatus as claimed in claim 1, wherein the apparatus further comprises at least one ventilating exit in fluid communication with the freezing chamber.

3. The apparatus as claimed in claim 2, the at least one ventilating exit further comprising a chimney adapted to divert freezing fluid away from a user.

4. The instant freezer apparatus as claimed in claim 1, wherein the freezing module is removable from the apparatus for unmolding purposes after the freezing operations.

5. The apparatus as claimed in claim 1, the apparatus further comprising a variable debit control system fluidly connected to the freezing fluid injection system.

6. The apparatus as claimed in claim 1, the apparatus further comprising a cover adapted to cover the freezing module and to freeze a portion of the substance present in the freezing cell in contact with the cover.

7. The apparatus as claimed in claim 6, the cover comprising a protrusion made of thermally conductive material and adapted to be immersed in the substance when the cover is closed.

8. The apparatus as claimed in claim 7, the protrusion being a nipple.

9. The apparatus as claimed in claim 1, the at least one freezing cell forming an open receptacle adapted to receive the substance to be frozen and being accessible to a user during freezing operations.

10. The apparatus as claimed in claim 1, the apparatus further comprising a cover, the cover comprising at least one protrusion adapted to be received by the at least one freezing cell.

11. The apparatus as claimed in claim 1, the freezing fluid injection system comprising at least one injector adapted to project freezing fluid toward the second surface of the at least one freezing cell.

12. The apparatus as claimed in claim 11, the freezing fluid injection system comprising more than two injectors, the injectors being symmetrically positioned.

13. The apparatus as claimed in claim 1, the freezing module comprising an opening formed to the shape of the second surface of the freezing cells.

14. The apparatus as claimed in claim 1, the apparatus further comprising a system to maintain the temperature of the freezing module at a predetermined level.

15. The apparatus as claimed in claim 1, the freezing fluid being liquid carbon dioxide.

16. The apparatus as claimed in claim 1, the substance to be frozen being a consumable substance.

* * * * *